(12) United States Patent
Modarresifar

(10) Patent No.: US 11,702,372 B2
(45) Date of Patent: Jul. 18, 2023

(54) THERMAL INSULATION

(71) Applicant: Thermal Ceramics UK Limited, Merseyside (GB)

(72) Inventor: Farid Modarresifar, Merseyside (GB)

(73) Assignee: Thermal Ceramics UK Limited, Merseyside (GB)

(*) Notice: Subject to any disclaimer, the term of this patent is extended or adjusted under 35 U.S.C. 154(b) by 0 days.

(21) Appl. No.: 17/507,008

(22) Filed: Oct. 21, 2021

(65) Prior Publication Data
US 2022/0127757 A1  Apr. 28, 2022

(30) Foreign Application Priority Data

Oct. 23, 2020 (GB) .................................. 2016878
Nov. 13, 2020 (GB) .................................. 2017916

(Continued)

(51) Int. Cl.
C03C 13/06 (2006.01)
C04B 35/622 (2006.01)
(Continued)

(52) U.S. Cl.
CPC ............ C04B 37/001 (2013.01); C01B 33/24 (2013.01); C03C 13/06 (2013.01);
(Continued)

(58) Field of Classification Search
CPC .................................................... C03C 13/06
See application file for complete search history.

(56) References Cited

U.S. PATENT DOCUMENTS 5,332,699 A  7/1994  Olds et al.
5,714,421 A  2/1998  Olds et al.
(Continued)

FOREIGN PATENT DOCUMENTS

CN   112251907 A   1/2021
EP   0257092 A1   3/1988
(Continued)

OTHER PUBLICATIONS

Tarmac Buxton Lime & Cement. "'CALBUX' (Quicklime) GRAN 158." Apr. 2007. (Year: 2007).*

*Primary Examiner* — Erin Snelting
(74) *Attorney, Agent, or Firm* — Servilla Whitney LLC

(57) ABSTRACT

A process for the manufacture of inorganic fibres comprises: (a) selecting a composition and proportion of: (i) silica sand; (ii) lime comprising at least 0.10 wt % magnesia; and (iii) optional additives comprising a source of oxides or non-oxides of one or more of the lanthanides series of elements, or combinations thereof; (b) mixing the silica sand; lime; and optional additives to form a mixture; (c) melting the mixture in a furnace; and (d) shaping the molten mixture into inorganic fibres. The raw materials selection comprises composition selection and proportion selection of the raw materials to obtain an inorganic fibre composition comprising a range of from 61.0 wt % and 70.8 wt % silica; less than 2.0 wt % magnesia; less than 2.0% incidental impurities; and no more than 2.0 wt % of metal oxides and/or metal non-oxides derived from said optional additives; with calcia providing the balance up to 100 wt %; and wherein the (Continued)

inorganic fibre composition comprises no more than 0.80 wt % $Al_2O_3$ derived from the incidental impurities and/or the optional additives.

26 Claims, 13 Drawing Sheets

(30) Foreign Application Priority Data

Mar. 5, 2021 (GB) .................................. 2103109
Jun. 30, 2021 (GB) .................................. 2109437

(51) Int. Cl.

| | | |
|---|---|---|
| C04B 37/00 | (2006.01) | |
| C01B 33/24 | (2006.01) | |
| F27D 1/00 | (2006.01) | |
| D01F 9/08 | (2006.01) | |
| E04B 1/78 | (2006.01) | |
| D01D 1/04 | (2006.01) | |
| D01D 5/08 | (2006.01) | |

(52) U.S. Cl.
CPC ......... *C04B 35/62227* (2013.01); *D01D 1/04* (2013.01); *D01D 5/08* (2013.01); *D01F 9/08* (2013.01); *E04B 1/78* (2013.01); *F27D 1/0003* (2013.01); *C01P 2002/52* (2013.01); *C01P 2002/60* (2013.01); *C01P 2004/03* (2013.01); *C01P 2006/32* (2013.01); *C01P 2006/37* (2013.01); *C04B 2237/341* (2013.01); *D10B 2101/02* (2013.01)

(56) References Cited

U.S. PATENT DOCUMENTS

| | | |
|---|---|---|
| 6,025,288 A | 2/2000 | Zoitos et al. |
| 6,953,757 B2 | 10/2005 | Zoitos et al. |
| 7,259,118 B2 | 8/2007 | Jubb et al. |
| 7,470,641 B2 | 12/2008 | Jubb et al. |
| 10,894,737 B2 | 1/2021 | Hankinson et al. |
| 2004/0254056 A1 | 12/2004 | Jubb et al. |
| 2012/0100983 A1 | 4/2012 | Yonaiyama et al. |
| 2014/0134444 A1 | 5/2014 | Ochi et al. |
| 2015/0163861 A1 | 6/2015 | Mihara et al. |

FOREIGN PATENT DOCUMENTS

| | | |
|---|---|---|
| GB | 2510739 A | 8/2014 |
| JP | 2000220037 A | 8/2000 |
| JP | 2002266169 A | 9/2002 |
| JP | 2003003335 A | 1/2003 |
| JP | 2005514318 A | 5/2005 |
| JP | 2006152468 A | 6/2006 |
| JP | 012102450 A | 5/2012 |
| JP | 2013071363 A | 4/2013 |
| JP | 2013136848 A | 7/2013 |
| JP | 2017194191 A | 10/2017 |
| JP | 2019503328 A | 2/2019 |
| WO | 8705007 A1 | 8/1987 |
| WO | 9415883 A1 | 7/1994 |
| WO | 03059835 A1 | 7/2003 |
| WO | 2022084655 A1 | 4/2022 |

\* cited by examiner

THERMAL INSULATION

CROSS-REFERENCE TO RELATED APPLICATIONS

This application claims priority to United Kingdom Application No. 2016878.7, filed Oct. 23, 2020, United Kingdom Application No. 2017916.4, filed Nov. 13, 2020, United Kingdom Application No. 2103109.1, filed Mar. 5, 2021, and United Kingdom Application No. 2109437.0, filed Jun. 30, 2021, the entire disclosures of which are hereby incorporated by reference herein.

FIELD OF THE INVENTION

This disclosure relates to processes for the manufacture of inorganic fibres and discloses insulation materials comprising said fibre and the use of said fibre at temperatures up to and in excess of 1200° C.

BACKGROUND

The insulation material industry has determined that it is desirable to utilize fibres in thermal, electrical and acoustical insulating applications, which do not persist in physiological fluids. That is, fibre compositions which are considered to have low biopersistence (i.e. bio-soluble) in physiological fluids.

While candidate silicate materials have been proposed, the use temperature limit of these materials have not been high enough to accommodate many of the applications to which high temperature resistant fibres are applied. For example, such bio-soluble fibres exhibit high shrinkage at use temperatures and/or reduced mechanical strength when exposed to use temperatures ranging from 1000° C. to 1500° C. as compared to the performance of refractory ceramic fibres.

The high temperature resistant fibres should exhibit minimal shrinkage at expected exposure temperatures, and after prolonged or continuous exposure to the expected use temperatures, in order to provide effective thermal protection to the article being insulated. In addition to bio-solublity and high temperature resistance the fibres should possess a low diameter and low shot content for the resultant insulation materials to have low density and thermal conductivity. The multitude of requirements do not end there, with fibres also needing to be non-reactive to other materials in the insulation system they may form part of.

In 1987 Manville Corporation developed bio-soluble high temperature resistant fibres based on a calcium magnesium silicate chemistry (U.S. Pat. No. 5,714,421). Such material not only had a higher temperature capability than traditional glass wools, but also had a higher solubility in body fluids than the aluminosilicate fibres mostly used for high temperature insulation. U.S. Pat. No. 5,714,421 taught the necessity to combine silica, calcia and magnesia with a variety of other metal oxide additives to obtain the desired combination of fibre properties and form.

While there are many commercial examples of the bio-soluble high temperature resistant fibres which have stemmed from magnesia, calcia, silica systems, there is still a need for improved bio-soluble high temperature resistant fibres and insulation material thereof.

International Application WO 87/05007 discloses inorganic fibres consisting essentially of $SiO_2$, CaO with specified ranges of MgO and $Al_2O_3$, which were obtained from metal oxides rather than raw by-product materials with variable composition. It was observed that lower $Al_2O_3$ levels resulted in a surprisingly high bio-solubility level.

International Application WO 94/15883 discloses CaO/MgO/$SiO_2$ fibres with additional constituents $Al_2O_3$, $ZrO_2$, and $TiO_2$, for which saline solubility and refractoriness were investigated. The document states that saline solubility appeared to increase with increasing amounts of MgO, whereas $ZrO_2$ and $Al_2O_3$ were detrimental to solubility. The presence of $TiO_2$ (0.71-0.74 mol %) and $Al_2O_3$ (0.51-0.55 mol %) led to the fibres failing the shrinkage criterion of 3.5% or less at 1260° C. The document further states that fibres that are too high in $SiO_2$ are difficult or impossible to form, and cites fibres having 70.04, 73.09, 73.28 and 78.07 wt % $SiO_2$ as examples of compositions which could not be fiberized.

U.S. Pat. No. 6,953,757 discloses an inorganic high silica fibre composition comprising predominately silica, calcia, magnesia and zirconia and optionally viscosity modifiers, such as alumina and boria, to enable product fiberisation.

JP2003003335 disclosures the inorganic fibres comprising silica and calcia to avoid precipitation of cristobalite at the fibres are heated to 1000° C. or greater. To avoid precipitation of cristobalite, the levels of $Na_2O$, $K_2O$, $TiO_2$, $Fe_2O_3$ and MgO are reduced or not added, with high purity calcia and silica used as raw materials.

US2004/254056 claimed CaO/$SiO_2$ fibres comprising greater than or equal to 72 wt % $SiO_2$, or for which the sum $SiO_2+ZrO_2+B_2O_3+5*P_2O_3$ was greater than 72 wt %. Such fibres had a low propensity for reaction with aluminosilicate bricks whereas fibres with lower $SiO_2+ZrO_2+B_2O_3+5*P_2O_5$ content tended to react adversely with aluminosilicate bricks.

Despite advances in the field, there is still a need for a simplified fibre composition which is not reliant upon a range of additives to obtain the required combination of fibre properties and form.

There is also a need for a simplified fibre composition which is not reliant on high impurity raw materials in their production, with the purification processes often used to produce such high purity raw materials increasing the carbon footprint of the resultant inorganic fibres.

SUMMARY OF THE DISCLOSURE

The applicant has found that, contrary to received wisdom in the field of refractory alkaline earth silicate fibres, that refractory fibres with high utility are able to be produced without the addition of significant amounts of additives, such as viscosity modifiers, solubility or refractory enhancers, to a $SiO_2$—CaO system, within a specified compositional range.

The present invention provides a process for the manufacture of inorganic fibres comprising:
  a. selecting a composition and proportion of each of the following raw materials:
    i. silica sand;
    ii. lime, said lime comprising at least 0.10 wt % magnesia; and
    iii. optional additives comprising a source of oxides or non-oxides of one or more of the lanthanides series of elements, Li, Na, K, Sr, Sn, Ba, Cr, Fe, Zn, Y, Zr, Hf, Ca, B, P or combinations thereof;
  b. mixing the silica sand; lime; and optional additives to form a mixture;
  c. melting the mixture in a furnace;
  d. shaping the molten mixture into inorganic fibres, wherein the raw material selection comprises composition selection and proportion selection of the raw materials to obtain an inorganic fibre composition comprising a range of from 61.0 wt % and 70.8 wt % silica; less than 2.0 wt % magnesia; less than 2% incidental impurities; and no more than 2.0 wt % of metal oxides and/or metal non-oxides derived from said optional additives; with calcia providing the balance up to 100 wt %; and wherein the inorganic fibre composition comprises no more than 0.80 wt % $Al_2O_3$ derived from the incidental impurities and/or the optional additives.

The inorganic fibres may, for example, have a composition comprising:

61.0 to 70.8 wt % $SiO_2$;
27.0 to 38.9 wt % CaO;
0.10 to 2.0 wt % MgO; and
optional other components providing the balance up to 100 wt %, wherein the sum of $SiO_2$ and CaO is greater than or equal to 97.8 wt % and wherein the other components, when present, comprise no more than 0.80 wt % $Al_2O_3$.

The inorganic fibres may, for example, have a composition comprising:

61.0 to 70.8 wt % $SiO_2$;
$SiO_2$+CaO is greater than or equal to 97.8 wt %.
0.10 to 2.0 wt % MgO; and
optional other components providing the balance up to 100 wt %, wherein the other components, when present, comprise no more than 0.80 wt % $Al_2O_3$.

It has been found that there is a narrow compositional window in which a small amount of MgO unexpectedly inhibits the formation of large surface crystallite grains at high temperatures, whilst not significantly affecting the high temperature performance of the fibres. Large surface crystallite grains on fibres may result in the creation of stress points which adversely affects the mechanical properties of the fibres at high temperatures. Therefore, it is desirable to minimise the size of the surface crystallite phases formed at high temperatures when the fibres are in use.

The sum of $SiO_2$ and CaO may be greater than or equal to 97.9 wt % or greater than or equal to 98.0 wt % or greater than or equal to 98.1 wt % or greater than or equal to 98.2 wt % or greater than or equal to 98.3 wt % or greater than or equal to 98.4 wt % or greater than or equal to 98.5 wt % or greater than or equal to 98.6 wt % or greater than or equal to 98.7 wt % or greater than or equal to 98.8 wt % or greater than or equal to 98.9 wt % or greater than or equal to 99.0 wt % or greater than or equal to 99.1 wt % or greater than or equal to 99.2 wt % or greater than or equal to 99.3 wt % or greater than or equal to 99.4 wt % or greater than or equal to 99.5 wt %. The higher proportion of $SiO_2$ and CaO (and the lower proportion of other components) is thought to reduce the propensity of surface crystallite formation at high temperatures. The upper limit of the purity is likely to be constrained by the cost and availability of raw materials, particularly raw materials with a relatively low carbon footprint (e.g. materials that have not been chemically purified or otherwise processed). The upper limit of the sum of $SiO_2$ and CaO may also be limited by the ability to manufacture inorganic fibres, particularly with fine fibre diameter (e.g. <6 μm and/or less than 52 wt % shot (<45 μm)).

The amount of MgO may be configured to inhibit the formation of surface crystallite grains upon heat treatment at 1100° C. for 24 hours, wherein said surface crystallite grains comprise an average crystallite size in the range of from 0.0 to 0.90 μm.

In addition to the presence of a small amount of MgO, the target compositional range may also be restricted in the amount of other components, such as additives or incidental impurities. In particular, limitations to the amount of alumina, titania and alkaline metal oxides are desirable to avoid the promotion of large crystallite grains.

The amount of other components may be configured to inhibit the formation of surface crystallite grains upon heat treatment at 1100° C. for 24 hours, wherein said surface crystallite grains comprise an average crystallite size in a range of from, 0.0 to 0.90 μm.

The inorganic fibres which after heat treatment at 1100° C. for 24 hours may comprise surface crystallite grains with an average crystallite size of 0.90 μm or less; or 0.80 μm or less; or 0.70 μm or less; or 0.60 μm or less; or 0.50 μm or less; or less than 0.40 μm. Preferably, there are no surface crystallite grains (i.e. crystallite size=0.0 μm) or no detectable surface crystallite grains.

The amount of MgO and/or other components may also be configured such that a vacuum cast preform of the fibres has a shrinkage of 3.5% or less when exposed to 1200° C. or 1300° C. for 24 hrs.

The fibre composition may be configured to comprise both crystallite grain inhibiting properties at high temperatures as well as possessing the low shrinkage properties.

The amount of other components may be no more than 2.1 wt % and may be no more than 2.0 wt % or no more than 1.9 wt % or no more than 1.8 wt % or no more than 1.7 wt % or no more than 1.6 wt % or no more than 1.5 wt % or no more than 1.4 wt % or no more than 1.3 wt % or no more than 1.2 wt % or no more than 1.1 wt % or no more than 1.0 wt % or no more than 0.9 wt % or no more than 0.8 wt % or no more than 0.7 wt % or no more than 0.6 wt %. Higher levels of other components may adversely affect the high temperature performance of the fibres. By being able to utilise raw materials with higher impurity levels, but within the prescribed ranges, greater utilisation of natural resources is obtainable without the need for further processing, including chemical purification. The other components typically comprise at least 0.2 wt % or at least 0.3 wt % or at least 0.4 wt % or at least 0.5 wt % of the inorganic fibre composition. While the use of more pure raw materials is possible, this is likely to be accompanied with an increased carbon footprint and cost due to the need for additional purification processes. Further, these other components, which may include incidental impurities, are thought to assist with fiberisation of the composition.

A small amount of additives may be included to fine-tune the properties of the fibres. Additive addition may be greater than 0.0 wt % or greater than 0.10 wt % or greater than 0.20 wt % or greater than 0.30 wt %. Additive addition may be less than 2.0 wt % or less than 1.7 wt % or less than 1.5 wt % or less than 1.4 wt % or less than 1.3 wt % or less than 1.1 wt % or less than 1.2 wt % or less than 1.0 wt % or less than 0.9 wt % or less than 0.8 wt % or less than 0.7 wt % or less than 0.6 wt % or less than 0.5 wt % or less than 0.4 wt % or less than 0.3 wt % or less than 0.2 wt % of the inorganic fibre composition.

The additives may be one or more metals in an oxide or non-oxide form, including but not limited to bromides, chlorides, fluorides, phosphates, nitrates, nitrites, oxides, carbonates and/or sulphates. Metals may for example include alkali metals, alkaline earth metals transition metals, post-transition metals and lanthanides. For the purposes of the present disclosure metal may also include metalloids.

In some embodiments, additives are added for the purpose of one or more of:

assisting in fiberisation (melt viscosity modifiers);
enhancing high temperature performance;
facilitating the formation of finer fibre diameters whilst maintaining the required bio-solubility and high temperature usage characteristics.

The additives may include oxides or non-oxides (e.g. fluorides) of one or more of the lanthanides series of elements (e.g. La, Ce), Li, Na, K, Sr, Ba, Cr, Fe, Zn, Y, Zr, Hf, Ca, B, P or combinations thereof. In another embodiment the other components comprise one or more oxides or non-oxides of lanthanides, Sr, Ba, Cr, Zr or combinations thereof. The fibre composition may include 0.05 to 1.0 wt % additives or 0.10 to 0.80 wt % or 0.15 wt to 0.60 wt % additives. The additives are preferably sourced from a naturally occurring mineral deposits. The addition of viscosity modifiers is particularly advantageous when added to fibre compositions with a $SiO_2$ content of greater than 66.0 wt % or 67.0 wt % or 68.0 wt % or 69.0 wt %.

It has been found that within this compositional window, bio-soluble high temperature resistant fibres are melt formable. Additionally, when the fibre composition of 65.7 wt % or greater $SiO_2$ the fibre has been shown to be also non-reactive in the presence of alumina based materials at high temperatures. Other networker formers (e.g. $ZrO_2$) have been shown to have a substitutability with $SiO_2$ and, as such, fibre compositions of 65.7 wt % or greater of the sum of $SiO_2+ZrO_2$ would also be expected to be non-reactive in the presence of alumina based materials at high temperatures.

In some embodiments, the inorganic fibres are non-reactive when in contact with an alumina composition (such as mullite) at 1200° C. for 24 hours. Alumina compositions preferably include compositions with at least 20 wt % $Al_2O_3$ or at least 30 wt % $Al_2O_3$ or at least 40 wt % $Al_2O_3$ or at least 50 wt % $Al_2O_3$. However, the benefits of this higher silica content may still exist at lower alumina content levels, depending upon the atmosphere, temperature and duration of exposure.

In some embodiments, the other components comprise or consist of incidental impurities in the raw materials used to make the inorganic fibres, including coal ash, when coal is used as an energy source to melt in the inorganic fibre precursor material, such as silica sand and lime.

In some embodiments, the main impurity in lime comprises magnesia. Other impurities may include alumina, iron oxide and alkali metal oxides, such as $K_2O$ and $Na_2O$.

In some embodiments, the sum of $SiO_2$ and CaO and MgO is greater or equal to 98.5 wt % or greater or equal to 98.8 wt % or greater or equal to 99.0 wt % or greater or equal to 99.1 wt % or greater or equal to 99.2 wt % or greater or equal to 99.3 wt % or greater or equal to 99.4 wt % or greater or equal to 99.5 wt % of the fibre composition.

In some embodiments, the inorganic fibre composition comprises less than 1.7 wt % MgO or less than 1.5 wt % MgO or less than 1.2 wt % or less than 1.0 wt % MgO or less than 0.90 wt % or less than 0.88 wt % or less than 0.85 wt % or less than 0.82 wt % or less than 0.80 wt % or less than 0.75 wt % or less than 0.70 wt % or less than 0.60 wt % MgO or less than 0.50 wt % or less than 0.45 wt % MgO derived from the incidental impurities. Higher contents of MgO has been found to detrimentally affect the thermal stability of the fibres at 1200° C. or 1300° C. The composition preferably comprises at least 0.11 wt % or at least 0.12 wt % or at least 0.14 wt % or at least 0.16 wt % or at least 0.18 wt % or at least 0.20 wt % MgO.

In some embodiment, the sum of $SiO_2+CaO+MgO+Al_2O_3$ is greater than or equal to 99.3 wt % or greater than or equal to 99.4 wt % or greater than or equal to 99.5 wt % or greater than or equal to 99.6 wt % or greater than or equal to 99.7 wt % of the inorganic fibre composition.

Preferably, inorganic fibre composition comprises less than 0.80 wt % $Al_2O_3$ or less than 0.79 wt % $Al_2O_3$ or less than 0.78 wt % $Al_2O_3$ or less than 0.77 wt % $Al_2O_3$ or less than 0.76 wt % $Al_2O_3$ or less than 0.75 wt % $Al_2O_3$ or less than 0.74 wt % $Al_2O_3$ or less than 0.73 wt % $Al_2O_3$ or less than 0.72 wt % $Al_2O_3$ or less than 0.71 wt % $Al_2O_3$ or less than 0.70 wt % $Al_2O_3$ or less than 0.69 wt % $Al_2O_3$ or less than 0.68 wt % $Al_2O_3$ or less than 0.67 wt % $Al_2O_3$ or less than 0.66 wt % $Al_2O_3$ or less than 0.65 wt % $Al_2O_3$ or less than 0.64 wt % $Al_2O_3$ or less than 0.63 wt % $Al_2O_3$ or less than 0.62 wt % $Al_2O_3$ or less than 0.61 wt % $Al_2O_3$ or less than 0.60 wt % $Al_2O_3$ or less than 0.55 wt % $Al_2O_3$ or less than 0.50 wt % $Al_2O_3$ or less than 0.45 wt % $Al_2O_3$ or less than 0.40 wt % $Al_2O_3$ or less than 0.35 wt % $Al_2O_3$ or less than 0.30 wt % $Al_2O_3$ or less than 0.25 wt % $Al_2O_3$, preferably derived from the incidental impurities. The amount of $Al_2O_3$ is typically 0.0 wt % or greater. Within the current $SiO_2$—CaO composition, higher levels of $Al_2O_3$ have been found to adversely affect the bio-solubility and thermal stability of the inorganic fibres, in addition to promoting crystallite growth at elevated temperatures.

In another embodiment, the sum of MgO and $Al_2O_3$ in the inorganic fibres is no more than 2.0 wt % or no more than 1.80 wt % or no more than 1.50 wt % or no more than 1.20 wt % or no more than 1.10 wt % or no more than 1.00 wt % or no more than 0.90 wt % or no more than 0.80 wt % or no more than 0.70 wt % or no more than 0.60 wt %.

In other embodiments, a vacuum cast preform of the inorganic fibre has a composition configured to obtain a shrinkage of 8.0% or less, 7.0% or less, 6.0% or less, 5.0% or less, 4.5% or less, 4.0% or less, 3.0% or less, 2.5% or less, or 2.0% or less when exposed to 1200° C. for 24 hours. In another embodiment, a vacuum cast preform of the inorganic fibre has a composition configured to obtain a shrinkage of 8.0% or less, 7.0% or less, 6.0% or less, 5.0% or less, 4.5% or less, 4.0% or less, 3.0% or less, 2.5% or less, or 2.0% less when exposed to 1300° C. for 24 hours.

The melting temperature of the inorganic fibres is preferably at least 1350° C. or at least 1380° C. or at least 1400° C. or at least 1420° C.

To aid fiberisation, particularly in the absence of additives, the $SiO_2$ content of the inorganic fibre composition is preferably less than 70.7 wt % or less than 70.6 wt % or less than 70.5 wt % or less than 70.4 wt % or less than 70.2 wt % or less than 70.0 wt % or less than 69.8 wt % or less than 69.6 wt %. less than 69.4 wt % or less than 69.2 wt % or less than 69.0 wt % or less than 68.8 wt % or less than 68.5 wt % or less than 68.3 wt % or less than 68.1 wt % or less than 68.0 wt %. To aid resiliency at high temperature and minimise reactivity with alumina containing substrates, the $SiO_2$ content of the inorganic fibre composition is preferably at least 61.1 wt % or at least 61.2 wt % or at least 62.3 wt % or at least 62.4 wt % or at least 62.5 wt % or at least 62.6 wt % at least 62.7 wt % or at least 62.8 wt % or at least 62.9 wt % or at least 63.0 wt % or at least 63.5 wt % or at least 64.0 wt % or at least 64.5 wt % or at least 65.0 wt % or at least 65.7 wt % or at least 65.8 wt % or least 66.0 wt % or at least 66.2 wt % or at least 66.4 wt % or at least 66.6 wt % or at least 66.8 wt % or at least 67.0 wt % or at least 67.2 wt % or at least 67.4 wt %.

The CaO content of the inorganic fibre composition preferably varies accordingly, with the lower limit of CaO preferably at least 27.0 wt % or at least 27.2 wt % at least 27.5 wt % or at least 28.0 wt % or at least 28.5 wt % or at least 29.0 wt % or at least 29.5 wt % or at least 30.0 wt %. The upper limit of the CaO content of the inorganic fibre composition is preferably no more than 38.5 wt % or no more than 38.0 wt % or no more than 37.5 wt % or no more than 37.0 wt % or no more than 36.5 wt % or no more than 36.0 wt % or no more than 35.5 wt % or no more than 35.0 wt % or no more than 34.5 wt % or no more than 34.0 wt % or no more than 33.5 wt % or no more than 33.0 wt % or no more than 32.5 wt % or no more than 32.0 wt %.

The MgO content of the inorganic fibre composition preferably comprises in the range of 0.1 to 1.7 wt % MgO; or 0.11 wt % to 1.50 wt % MgO; or 0.12 wt % to 0.1.30 wt %; or 0.1 to 1.0 wt % MgO; or 0.11 wt % to 0.90 wt % MgO; or 0.12 wt % to 0.85 wt % MgO; or 0.13 wt % to 0.80 wt % MgO or 0.14 wt % to 0.75 wt % MgO; or 0.17 wt % to 0.72 wt % MgO; or 0.15 wt % to 0.70 wt % MgO; or 0.15 wt % to 0.65 wt % MgO; or 0.17 wt % to 0.60 wt % MgO; or 0.18 wt % to 0.50 wt % MgO; or 0.19 wt % to 0.45 wt % MgO; or 0.20 wt % to 0.40 wt % MgO.

In one embodiment, the other components comprise:
0 or 0.01 to 0.8 wt % $Al_2O_3$ or 0.10 to 0.60 wt % $Al_2O_3$ or 0.20 to 0.55 wt % $Al_2O_3$ or 0.23 to 0.50 wt % $Al_2O_3$ or 0.24 to 0.45 wt % $Al_2O_3$ or 0.25 to 0.40 wt % $Al_2O_3$ or 0.25 to 0.35 wt % $Al_2O_3$;
0 to 0.50 wt % alkali metal oxides or 0.01 to 0.45 wt % alkali metal oxides or 0.03 to 0.40 wt % alkali metal oxides or 0.04 to 0.35 wt % alkali metal oxides or 0.05 to 0.30 wt % alkali metal oxides or 0.06 to 0.25 wt % alkali metal oxides or 0.07 to 0.20 wt % alkali metal oxides or 0.08 to 0.18 wt % alkali metal oxides;
0 to 1.0 wt % $TiO_2$ or 0.05 to 0.8 wt % $TiO_2$ or 0.10 to 0.6 wt % $TiO_2$ or 0.15 to 0.4 wt % $TiO_2$ or 0 to 0.2 wt % $TiO_2$; or
0 to 1.0 wt % $ZrO_2$ or 0.05 to 0.8 wt % $ZrO_2$ or 0.10 to 0.6 wt % $ZrO_2$ or 0.15 to 0.4 wt % $ZrO_2$ or 0 to 0.2 wt % $ZrO_2$;

In some embodiments, at least 80 wt % of the alkali metal oxides comprise $Na_2O$ or $K_2O$.

In one embodiment, the range of other incidental impurities in the inorganic fibres is:
BaO: 0 to 0.05 wt % or >0 to 0.01 wt %
$B_2O_3$: 0 to 0.1 wt % or >0 to 0.05 wt %
$Cr_2O_3$: 0 to 0.08 wt % or >0 to 0.03 wt %
$Fe_2O_3$: 0 to 0.25 wt % or >0 to 0.15 wt %
$HfO_2$: 0 to 0.05 wt % or >0 to 0.01 wt %
$La_2O_3$: 0 to 0.1 wt % or >0 to 0.03 wt %
$Mn_3O_4$: 0 to 0.05 wt % or >0 to 0.01 wt %
$Li_2O$: 0 to 0.15 wt % or >0 to 0.08 wt %
$Na_2O$: 0 to 0.15 wt % or >0 to 0.08 wt %
$K_2O$: 0 to 0.5 wt % or >0 to 0.20 wt %
$P_2O_5$: 0 to 0.05 wt % or >0 to 0.01 wt %
SrO: 0 to 0.08 wt % or >0 to 0.03 wt %
$TiO_2$: 0 to 0.08 wt % or >0 to 0.03 wt %
$V_2O_5$: 0 to 0.05 wt % or >0 to 0.01 wt %
$SnO_2$: 0 to 0.05 wt % or >0 to 0.01 wt %
ZnO: 0 to 0.05 wt % or >0 to 0.01 wt %
$ZrO_2$: 0 to 0.1 wt % or >0 to 0.02 wt %

The sum of $BaO+Cr_2O_3+Fe_2O_3+HfO_2+La_2O_3+Mn_3O_4+Na_2O+K_2O+P_2O_5+SrO+SnO_2+TiO_2+V_2O_5+ZrO_2+ZnO$ is preferably less than 2.0 wt % or less than 1.8 wt % or less than 1.6 wt % or less than 1.4 wt % or less than 1.2 wt % or less than 1.0 wt % or less than 0.8 wt % or less than 0.6 wt % or less than 0.5 wt % or less than 0.4 wt % or less than 0.3 wt % or less than 0.25 wt % or less than 0.2 wt % of the total weight of the inorganic fibres. The sum of $BaO+Cr_2O_3+Fe_2O_3+HfO_2+La_2O_3+Mn_3O_4+Na_2O+K_2O+P_2O_5+SrO+SnO_2+TiO_2+V_2O_5+ZrO_2+ZnO$ is typically at least 0.10 wt % or at least 0.20 wt % or at least 0.30 wt % of the total weight of the inorganic fibres.

In one embodiment, the silica level of the inorganic fibres is configured to inhibit the reactivity of the inorganic fibres, such that the inorganic fibres are non-reactive with mullite when in contact at 1200° C. for 24 hours.

The inorganic fibres may have a composition comprising:
65.7 to 70.8 wt % $SiO_2$;
27.0 to 32.3 wt % CaO;
0.10 to 2.0 wt % MgO; and
optional other components providing the balance up to 100 wt %,
wherein the sum of $SiO_2$ and CaO is greater than or equal to 97.8 wt % and wherein the other components, when present, comprise no more than 0.80 $Al_2O_3$.

The fibres of this embodiment are particularly suited to insulations systems in which the inorganic fibres are configured to be in contact with a refractory component comprising alumina, such as mullite.

In another embodiment, the inorganic fibres have a composition comprising:
66.0 to 69.0 wt % or (65.7 to 69.0 wt %) $SiO_2$ or the sum of $SiO_2+ZrO_2$;
30.0 to 34.0 wt % CaO or (30.0 to 34.2 wt %) CaO;
0.10 to 0.45 wt % (or 0.1 to 0.45 wt %; or 0.1 to 0.60 wt %) MgO
0 to 0.35 wt % (or 0.1 to 0.35 wt %; or 0 to 0.45 wt %; or 0 to 0.60 wt %) $Al_2O_3$
0 to 0.20 wt % (or 0.05 to 0.18 wt %) alkali metal oxides and
wherein the sum of $SiO_2$ and CaO is greater or equal to 99.0 wt %.

In some embodiments, the numerical average (or arithmetic mean) fibre diameter is less than 6.0 μm or less than 5.0 μm or less than 4.5 μm or less than 4.0 μm or less than 3.5 μm or less than 3.3 μm or less than 3.0 μm or less than 2.8 μm or less than 2.5 μm. Minimum numerical average fibre diameter is typically at least 1.5 μm or at least 2.0 μm to enable the fibres to have sufficient mechanical strength in use.

In some embodiments, the shot content (>45 μm) of the inorganic fibres is less than 51 wt % or less than 50 wt % or less than 49 wt % or less than 48 wt % or less than 47 wt % or less than 46 wt % or less than 45 wt % or less than 44 wt % or less than 43 wt % or less than 42 wt % or less than 41 wt % or less than 40 wt % or less than 39 wt % or less than 38 wt % or less than 37 wt % or less than 36 wt % or less than 35 wt % or less than 34 wt % or less than 33 wt %.

A combination of reduced fibre diameter and lower shot content results in improved insulative properties.

The inorganic fibres may be incorporated into thermal insulation for use in applications preferably requiring continuous resistance to temperatures of up to 1300° C. or in some embodiments 1200° C. or more (e.g. a classification temperature of 1100° C. or 1150° C. or 1200° C. or 1260° C. or 1300° C. (EN 1094-1-2008)).

In some embodiments, the fibre has a dissolution rate, in the flow solubility test (pH 7.4), is preferably at least 130 ng/cm² hr or at least 140 ng/cm² hr or at least 150 ng/cm² hr or at least 170 ng/cm² hr or at least 200 ng/cm² hr; or at least 250 ng/cm² hr.

In some embodiments, the tensile strength of the fibre blanket (128 kg/m³) is at least 50 kPa or at least 55 kPa or at least 60 kPa. The fibre blanket strength may be determined in accordance to EN 1094-1 (2008).

In some embodiments, the thermal conductivity at 1000° C. of a 128 kg/m³ fibre blanket is no more than 0.30 $W·m^{-1}·K^{-1}$ or no more than 0.28 $W·m^{-1}·K^{-1}$ or more than 0.26 $W·m^{-1}·K^{-1}$ or no more than 0.25 $W·m^{-1}·K^{-1}$. The fibre blanket thermal conductivity may be determined in accordance to ASTM C201-93 (2019).

The thermal conductivity at 1200° C. of a 128 kg/m³ fibre blanket is preferably no more than 0.35 $W·m^{-1}·K^{-1}$ or no more than 0.32 $W·m^{-1}·K^{-1}$ or no more than 0.31 $W·m^{-1}·K^{-1}$ or no more than 0.30 $W·m^{-1}·K^{-1}$ or no more than 0.29 $W·m^{-1}·K^{-1}$.

In some embodiments, the resiliency of the fibre as made is at least 80%. The resiliency after 1100° C. for 24 hrs is preferably at least 70 wt % or at least 75 wt %. The resiliency after 1150° C. for 24 hrs is preferably at least 63 wt % or at least 67 wt % or at least 70 wt % or at least 72 wt % or at least 74 wt %. The resiliency after 1200° C. for 24 hrs is preferably at least 60 wt % or least 63 wt % or at least 67 wt % or at least 70 wt %.

By maintaining the other components (e.g. incidental impurities) within the above limits, the inorganic fibres of the present disclosure are able to maintain excellent high temperature utility. While it may be possible for individual impurities levels to vary from their preferred range, through maintaining an overall low level of incidental impurities, the need for adding additives (e.g. viscosity modifier, solubility enhancer, refractory temperature stabiliser, etc.) to the calcia and silica mixture may be avoided or minimised.

Fiberisation techniques as taught in U.S. Pat. No. 4,238,213 or US2012/247156 may be used to form the disclosed fibres of the present disclosure. The apparatus and techniques disclosed in WO2017/121770 (which is incorporated herein in its entirety by reference) may be preferably used, particularly for compositions comprising higher silica contents (e.g. >68 wt % or >69 wt %).

The shaping of the molten mixture into inorganic fibres may comprising forming strands of the molten mixture and quenching the molten mixture to solidify it.

In embodiments comprising the addition of additives, no more than 1.9 wt % or no more than 1.8 wt % or no more than 1.7 wt % or no more than 1.6 wt % or no more than 1.5 wt % or no more than 1.4 wt % or no more than 1.3 wt % or no more than 1.2 wt % or no more than 1.1 wt % or no more than 1.0 wt % or no more than 0.9 wt % or no more than 0.8 wt % of metal oxides and/or metal non-oxides in the organic fibre composition are derived from said optional additives. Raw materials are inclusive of the optional additives.

In one embodiment, the composition selection and proportion selection of the raw materials is configured so the amount of magnesia in the inorganic fibre composition is sufficient to inhibit the formation of surface crystallite grains upon heat treatment at 1100° C. for 24 hours, wherein said surface crystallite grains have an average crystallite size of 0.90 μm or less. The magnesia content of inorganic fibre composition may be at least 0.08 wt % or at least 0.10 wt %.

In some embodiments, the raw materials consist of silica sand, and lime (i.e. no additives, but incidental impurities may be present). By restricting the number of raw materials, the carbon footprint of the process may be reduced. The lime is preferably selected such that the resultant fibre composition comprises in the range of 0.10 to 2.0 wt % MgO and no more than 0.80 wt % $Al_2O_3$ or as otherwise defined in the first aspect of the present disclosure.

The composition selection and proportion selection may be configured to obtain the inorganic fibres compositions of the first aspect of the present disclosure.

In one embodiment, the composition selection of the raw materials involves doping amounts of selected incidental impurities (e.g. up to 2.0 wt % or up to 3.0 wt %) into the raw materials to determine the shrinkage of the resultant inorganic fibres when exposed to 1300° C. for 24 hrs and using this information to determine a target composition selection range of the silica sand and lime. By determining the limits of incidental impurities, a broader arrange of raw material sources may be used without the need for additional chemical purification.

The composition of the silica sand and/or lime may be obtained through blending different batches of silica sand and/or lime to obtain the target composition. The target composition may be selected to control the shrinkage and/or crystallite grain size when the inorganic fibres are exposed to temperatures of 1100° C. or more.

The raw materials preferably have not been chemically purified. Chemical purification includes chemical leaching or extraction techniques, but may exclude water washing operations. Each of the raw materials are preferably sourced from a natural mineral deposit.

In one embodiment, the composition selection and proportion selection of the raw materials is configured to obtain a vacuum cast preform of the inorganic fibres comprising a shrinkage of 6.0% or less (or 4.0% or less or 3.5% or less) when exposed to 1300° C. for 24 hrs.

In one embodiment, the composition selection and proportion selection of the raw materials is configured to obtain an inorganic fibre content comprising at least 65.7 wt % silica.

In some embodiments, the composition selection and proportion selection of the raw materials is configured such that the inorganic fibres comprise less than 2.0 wt % incidental impurities or less than 1.5 wt % incidental impurities less than 1.0 wt % incidental impurities or less than 0.8 wt % incidental impurities or less than 0.6 wt % incidental impurities. The selection of the fuel source may also be used to control the composition and proportion of incidental impurities (e.g. coal ash levels).

In some embodiments, no more than 3.0 wt % or no more than 2.5 wt % or no more than 2.2 wt % or no more than 2.0 wt % or no more than 1.8 wt % or no more than 1.5 wt % or no more than 1.2 wt % of the inorganic fibres are derived from the sum of incidental impurities and optional additives.

Preferably the sum of magnesia and incidental impurities is greater or equal to 0.3 wt % or greater or equal to 0.4 wt %. The amount of magnesia and incidental impurities being sufficient to reduce the melt viscosity of the composition and enable fibres to be formed as described in previous aspects of the disclosure.

It should be understood that usage in compositions of the names of oxides [e.g. alumina, silica, potassia] does not imply that these materials are supplied as such, but refers to the composition of the final fibre expressing the relevant elements as oxides. The materials concerned may be provided in whole or in part as mixed oxides, compounded with fugitive components [e.g. supplied as carbonates] or indeed as non-oxide components [e.g. as halides].

Incidental impurities are defined as impurities which are derived from the raw material, fuel source or other sources during the formation of the inorganic fibres. Material composition is determined on a dry weight basis.

DETAILED DESCRIPTION OF A PREFERRED EMBODIMENT

Figure 1:
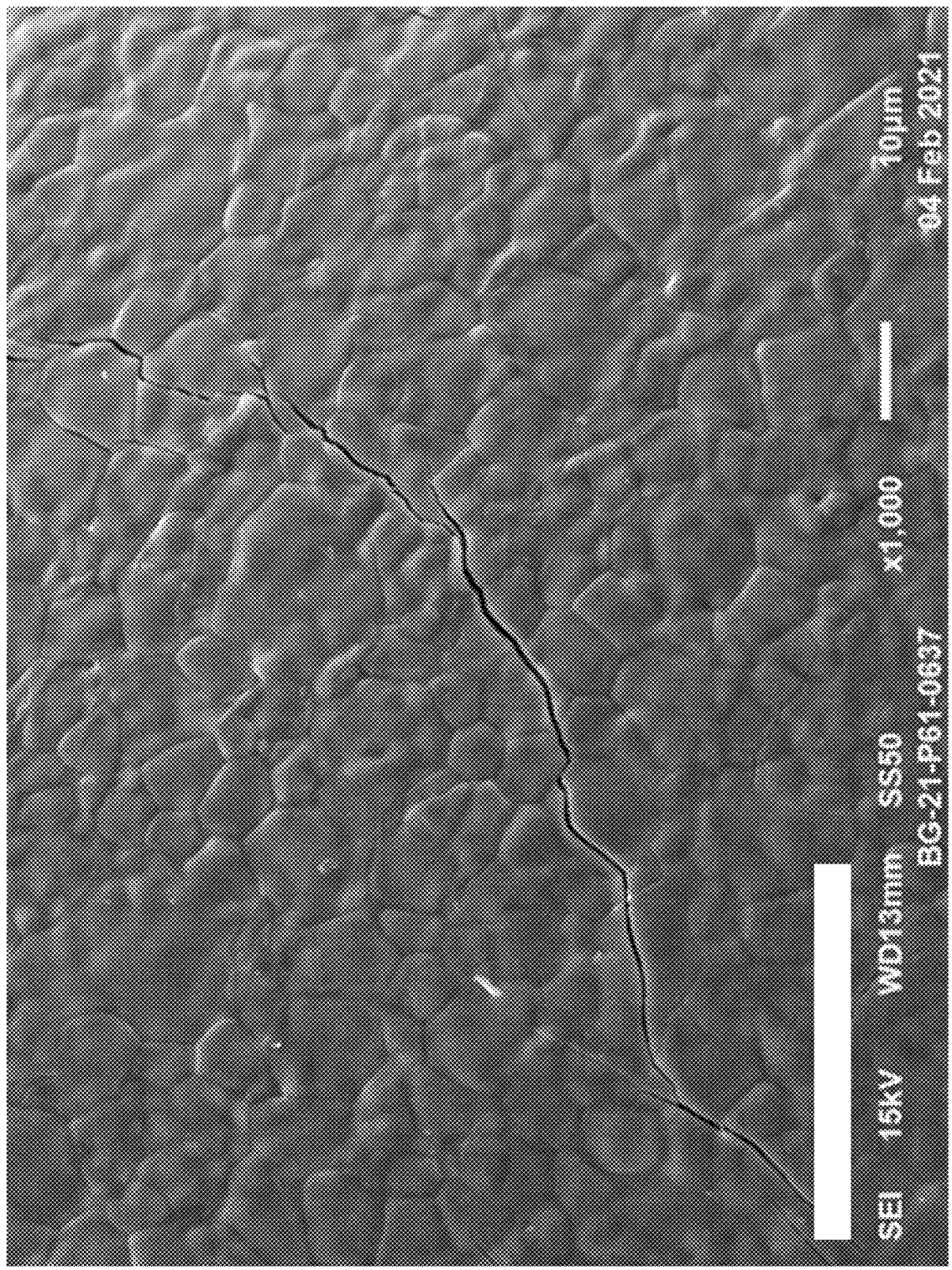
FIG. 1 is a SEM image of a fibre from sample 24

Fibres according to the disclosure and comparative fibres described herein have been produced at either the French production facilities in Saint Marcellin, France by spinning [made from the melt by forming a molten stream and converting the stream into fibre by permitting the stream to contact one or more spinning wheels]; or at the applicant's research facilities in Bromborough, England by spinning or alternatively by blowing [fibres made from the melt by forming a molten stream and converting the stream into fibre by using an air blast directed at the stream]. The disclosure is not limited to any particular method of forming the fibres from a melt, and other methods [e.g. rotary or centrifugal formation of fibres; drawing; air jet attenuation] may be used. The resultant fibres were then fed onto a conveyor belt and entangled by needling methods, as known in the art.

The raw materials used to produce the inorganic fibres of a preferred embodiment of the present disclosure are lime and silica sand. The chemical analysis (normalised) of the lime used is provided in Table 1 below. The incidental impurities (100-CaO—$SiO_2$) in the lime is typically less than 2.0 wt %. The silica sand purity may be 98.5 wt % or 99.0 wt % or higher. Typically, the silica sand had a purity of greater than 99.5 wt % silica and less than 200 ppm $Fe_2O_3$; less than 1000 ppm $Al_2O_3$; less than 200 ppm $TiO_2$, less than 100 ppm CaO and less than 100 ppm $K_2O$.

Some of the compositions produced had elevated $K_2O$ levels due to the additional of fluxing agents in the pilot scale furnace in Bromborough or due to cross-contamination from previous production in the Saint Marcellin furnace. Amongst others, samples P61-0481 and P61-0488 are representative of compositions produced from the raw materials of silica sand and lime only.

TABLE 1

| Lime bag | CaO | $Al_2O_3$ | $Fe_2O_3$ | $K_2O$ | MgO | $SiO_2$ | $ZrO_2$ | Un-normalised XRF total |
|---|---|---|---|---|---|---|---|---|
| B1 | 97.97 | 0.28 | 0.21 | 0.04 | 0.41 | 1.09 | 0.01 | 98.39 |
| B2 | 98.12 | 0.30 | 0.21 | 0.04 | 0.38 | 0.93 | 0.00 | 99.17 |
| B3 | 97.79 | 0.30 | 0.21 | 0.04 | 0.37 | 1.26 | 0.02 | 99.39 |
| B4 | 97.56 | 0.35 | 0.21 | 0.04 | 0.38 | 1.43 | 0.01 | 99.00 |
| B5 | 97.64 | 0.54 | 0.21 | 0.04 | 0.38 | 1.15 | 0.01 | 99.94 |
| B6 | 97.61 | 0.49 | 0.22 | 0.04 | 0.41 | 1.15 | 0.04 | 99.92 |
| B7 | 97.97 | 0.33 | 0.20 | 0.04 | 0.40 | 1.01 | 0.01 | 98.93 |
| B8 | 95.15 | 0.34 | 0.20 | 0.04 | 0.40 | 3.85 | 0.00 | 99.94 |

TABLE 1-continued

The fibres/blankets made therefrom were then evaluated using the test methodology as described:

Test Methodology
The EN 1094-1-2008 standard was used for the shrinkage, tensile strength and resiliency tests.

Shot Content
Shot content was determined by a jet sieve method as detailed in WO2017/121770, incorporated herein by reference.

Thermal Stability (Shrinkage)
The method for determination of dimensional stability of refractory materials, including the refractory glass fibre insulation materials, is based on the EN ISO 10635. This method is a shrinkage test that measures the change of a flat specimen's linear dimensions after a heat treatment.

The shrinkage test requires a relatively rigid specimen's so that the linear dimensions could be accurately determined before and after the heat treatment. In cases where a needled fibre blanket specimen were not available, starch bonded vacuum formed boards were prepared from the glass fibre samples.

To prepare the vacuum formed boards, the as made fibre material were chopped using a small-scale industrial granulator through a #6 mesh (~3 mm opening). Chopped fibre samples were lightly cleaned using a sieve to remove any debris and large glass residues. 40 g of chopped clean fibre was mixed in 500 ml of 5 wt % concentration potato starch in water solution to create a slurry. Subsequently a vacuum former was used to produce 75×75 mm boards with a thickness of 10-15 mm. The vacuum former consists of a sealed acrylic mould with a 100 μm mesh bottom, a vacuum pump was used to remove the water from the slurry while manually compressing the shape using a flat plate. Vacuum formed boards were dried at 120° C.

To measure permanent linear shrinkage, the linear dimensions of specimen were measured to an accuracy of ±5 μm using a travelling microscope. The specimens were subsequently placed in a furnace and ramped to a temperature 50° C. below the test temperature (e.g. 1300° C.) at a rate of 300° C./hour and then ramped at 120° C./hour for the last 50° C. to test temperature and held for 24 hours. Specimens were allowed to cool down naturally to room temperature at the end of this heat treatment. After heat treatment, the specimen's linear dimensions were measured again using the same apparatus to calculate the change in dimensions. Shrinkage values are given as an average of 4 measurements.

Reactivity with Mullite
Needled fibre blanket specimens with approximate dimensions of 50 mm×100 mm were used for this test. Blanket specimens were placed on a fresh mullite Insulating Fire Brick (JM 28 IFB). The specimen, along with the IFB substrate, was heated treated at 1200° C. for 24 hours to confirm the reactivity after the heat treatment. The specimen and IFB were inspected for any sign of melting or reaction. The sample which did not react with the IFB at all were evaluated as good (○). The sample which reacted with the IFB (the sample was adhered to IFB or sign of melting was observed) were evaluated as poor (X).

Bio-Solubility

The biological solubility of fibrous materials can be estimated in a system in which the material is exposed to a simulated body fluid in a flow-through apparatus (i.e., in vitro). This measurement of solubility is defined as the rate of decrease of mass per unit surface area (Kdis). Although several attempts have been made to standardize this measurement, there is currently no international standard. Major protocol differences among laboratories include different simulated body fluid chemistries (and, most significantly, different buffering and organic components), flow rates, mass and/or surface area of samples, determination methods for specific surface area, and determination of mass loss. Consequently, Kdis values should be regarded as relative estimates of chemical reactivity with the simulated body fluid under the specific parameters of the test, not as measures of absolute solubility of fibrous particles in the human lung. The flow through solubility test method used in this study is a 3-week long solubility test in pH 7.4 saline. Two channels of each unique specimen are simultaneously tested. Samples of saline solution flowing over the fibre specimens are taken after 1, 4, 7, 11, 14, 19 and 21 days. The saline samples are analysed using the ICP method to measure the oxide dissolution levels in ppm level. To validate the flow test results and calculate the final dissolution rates for each specimen, the square root of remaining fibre mass against sampling times are plotted. Deviation from a linear trend could suggest an issue with the results. A good linear regression fit was observed in the flow test results conducted in this study. Based on the historical data collected by authors, a minimum of 150 ng/cm² hr dissolution rate is typically required for a fibre to have exoneration potential. In the static solubility test method, fibre specimens are agitated in saline solution at 37° C. to replicate conditions within the lungs. The test monitors fibre dissolution after 24 hours using the ICP method. $SiO_2$ and CaO typically make up the majority of the dissolution material.

Resiliency

The resiliency test (EN1094-1-2008) demonstrates the ability of fibre insulation products to spring back after being compressed to 50% of their initial thickness. Samples for resiliency testing in this document were in needled blanket form. As made or heat treated blanket specimens were cut to 100 mm×100 mm squares and dried at 110° C.±5° C. for 12 hours to remove any absorbed moisture. Specimens were subsequently allowed to cool to room temperature and then test immediately. The initial thickness of blanket specimens were measured using the pin and disk method prior to resiliency testing. An Instron™ universal mechanical test frame, equipped with 150 mm diameter flat compression platens was used for the resiliency tests. During the test, the specimens were compressed to 50% of their original thickness at a rate of 2 mm/min, the specimens were then held under compression for 5 minutes. Subsequently the specimens were allowed to spring back by lifting the compression platen until 725 Pa (for specimens 96 kg/m³ bulk density) or 350 Pa (for specimens <96 kg/m³ bulk density) was registered on the load cell and then held for a further 5 minutes. Following this test, the resiliency values were calculated using the formula below:

$$R = \frac{d_f}{d_0} \times 100$$

R=Resiliency
$d_f$=Thickness after testing
$d_0$=Initial Thickness

Tensile Strength

The parting strength of a blanket is determined by causing rupture of test pieces at room temperature. Samples are cut using a template (230±5 mm×75±2 mm). The samples are dried at 110° C. to a constant mass, cooled to room temperature and then measured and tested immediately.

The width is measured using a steel rule to a 1 mm accuracy across the middle of the piece and the thickness of the sample is measured on each sample (at both ends of the sample) using the EN1094-1 needle method. A minimum of 4 samples for each test are taken along the direction of manufacture.

The samples are clamped at each end by clamps comprising a pair of jaws having at least 40 mm×75 mm in clamping area with serrated clamping surfaces to prevent slippage during the test. These dimensions give an unclamped span of 150±5 mm to be tested. The clamps are closed to 50% of the sample thickness (measured using a Vernier caliper or ruler).

The clamps are mounted in a tensile testing machine [e.g. Instron™ 5582, 3365 using a 1 kN load cell, or a machine of at least the equivalent functionality for testing tensile strength]. The crosshead speed of the tensile testing machine is a constant 100 mm/min throughout the test. Any measurement with the sample breaking nearer to the clamp jaw than to the centre of the sample is rejected.

The maximum load during the test is recorded to allow strength to be calculated.

Tensile strength is given by the formula:

$$R(m) = \frac{F}{W \times t}$$

Where:
R(m)=Tensile Strength (kPa)
F=Maximum Parting Force (N)
W=Initial Width of the active part of the test piece (mm)
T=Initial Thickness of test piece (mm)

The test result is expressed as the mean of these tensile strength measurements together with the bulk density of the product.

Fibre Diameter

Fibre diameter measurements were carried out using the Scanning Electron Microscope (SEM). SEM is a microanalytical technique used to conduct high magnification observation of materials' microscopic details. SEM uses a tungsten filament to generate an electron beam, the electron beam is then rastered over a selected area of the specimen and the signal produced by the specimen is recorded by a detector and processed into an image display on a computer. A variety of detectors can be used to record the signal produced by the sample including secondary electrons and backscattered electrons detectors.

The particular SEM equipment used operates under vacuum and on electrically conductive specimens. Therefore, all glass/ceramic fibre specimens need to be coated with gold or carbon prior to SEM analysis. Coating was applied using an automated sputter coater at approximately 20 nm. In order to prepare the fibrous specimens for diameter measurements, fibre specimens were crushed using a pneumatic press at 400 psi (2.8 MPa). The aim of crushing is to ensure the sample is crushed enough to be dispersed without compromising the fibre length, crushing results in fibres with aspect ratios >3:1. The crushed fibre specimens is then cone and quartered to ensure representative sampling. Crushed and quartered fibres are dispersed in IPA. Typically, 50 µg of fibres are placed in a 50 mL centrifuge tube and 25 mL IPA is added. A SEM stub is then placed at centre of a petri dish, then the centrifuge tube is vigorously shaken and emptied into the petri dish containing the SEM stub. The petri dish is left in fume cupboard for 1 hour for the fibres to settle on the SEM stub. The SEM stub is then carefully coated with gold in preparation for SEM imaging.

Following this sample preparation step, an automated software on the SEM equipment is utilised to collect 350 unique secondary electron images at 1500× magnification from the SEM stub. Following the image collection step, the images are processed by the Scandium® system available from Olympus Soft Imaging Solutions GmbH, to measure the diameter of fibres. The process involves manual inspection of measured fibres in every image to ensure only the fibres particles with aspect ratios greater than 3:1 are measured. The final fibre diameter distribution is reposted in a graph as well as numerical average/arithmetic mean diameter.

Crystallite Grain Size

Crystallite grain size measurements on heat treated fibre materials were carried out using the Scanning Electron Microscope (SEM). SEM is a micro-analytical technique used to conduct high magnification observation of materials' microscopic details. SEM uses a tungsten filament to generate an electron beam, the electron beam is then rastered over a selected area of the specimen and the signal produced by the specimen is recorded by a detector and processed into an image display on a computer. A variety of detectors can be used to record the signal produced by the sample including secondary electrons and backscattered electrons detectors.

The particular SEM equipment used operates under vacuum and on electrically conductive specimens. Therefore, all glass/ceramic fibre specimens need to be coated with gold or carbon prior to SEM analysis. Coating was applied using a automated sputter coater at approximately 20 nm. In order to prepare the fibrous specimens for grain size measurements, fibre specimens were cone and quartered to ensure representative sampling. A SEM stub is prepared with a small representative sample of the specimen and carefully coated with gold in preparation for SEM imaging.

Following this sample preparation step, the SEM equipment is utilised to collect several unique secondary electron images at suitable magnification based on morphology (typically in 5000-10000× magnification range) from the SEM stub. Following the image collection step, the images are processed by a computer software program (Olympus Scandium®) to measure the grain size by drawing circles around the visible grain boundaries in several SEM images. The process involves manual inspection of fibres in every image to ensure only the fibres are in focus. The final grain size is reported as numerical average of all measurements (preferably a minimum of 10 measurements of representative crystals). Preferably, the crystallite size is determined from a random selection of at least five fibres, with measurements of representative crystallite sizes of 5 grains taken from each fibre. Fibre measurements falling more than 2 standard deviations from the mean are to be disregarded. Due to limitations in magnification and resolution of SEM images, the minimum measurable grain size was about 0.4 µm. Samples with lower crystallite grain sizes were reported as having a mean grain size value <0.4 µm.

Crystalline grains are differentiated from other surface imperfections by their regularity in frequency and shape, which is characterized by the crystallites protruding from the surface of the fibre, as indicated in the increase grain sizes from FIGS. 4a to FIG. 4d. Surface imperfections include irregular shaped platelet formations as illustrated on FIGS. 3b and 3d.

Melting Temperature

The melting temperature of the fibres was determined by DSC (10 k/min temperature increase from 30° C. to 1500° C.). Sample 26b (50 mg of fine powder ground from fibre) had a melting temperature of 1435.3° C.

Fibre Composition

Fibre composition was determined using standard XRF methodology. Results were normalised after analysis performed on $SiO_2$, CaO, $K_2O$, $Al_2O_3$, MgO and oxide components listed in Table 6. Un-normalised results were discarded if the total weight of the composition fell outside the range 98.0 wt % to 102.0 wt %.

Effects of Impurities

To assess the effects of the incidental impurities in the raw materials, an ultra pure sample (C-24) was produced using a silica (SiO2: 99.951 wt %, $Al_2O_3$: 0.038 wt % $Fe_2O_3$: 0.012 wt %) and calcia (CaO: 99.935 wt %, $SiO_2$: 0.011 wt %, $Al_2O_3$: 0.012 wt % $Fe_2O_3$: 0.011 wt %, SrO: 0.031 wt %). The remaining components were less than the XRF detection limit (<0.01 wt %).

To assess the effect of impurities, additional amounts of $Al_2O_3$, MgO, $TiO_2$ and $ZrO_2$ were added to the existing incidental impurities. With reference to Table 4a, increasing amounts of MgO, $TiO_2$ and $Al_2O_3$ results in reduced thermal stability at 1300° C. (24 hrs), as measured by the % shrinkage. Example 34 is a near repetition of sample E-174 from U.S. Pat. No. 5,332,699.

Results

Referring to Table 2 & 3, there is shown the composition of inorganic fibres as % weight of the total composition according to Examples 1 to 26b, P61-0481, P61-0488 and Comparative Examples C1 to C5; C-27, C-34-C-36. As illustrated in Table 3, inorganic fibre compositions with silica levels less than 65.7 wt % were found to be not compatible with mullite based bricks, adhering to the bricks after being in contact at 1200° C. for 24 hrs. Inorganic fibre compositions with higher silica levels had generally higher shot content and higher fibre diameter. The result from sample P50 indicates that $ZrO_2$ may be able to partially substitute $SiO_2$ in the glassy forming network, with these samples also being compatible with mullite based bricks despite the low $SiO_2$ content of the samples. The incorporation of a small portion (e.g. up to 2.0 wt % or up to 1.5 wt %) $ZrO_2$ within the glassy network is likely to maintain the non-reactive nature of the composition to mullite based bricks or other alumina based compositions.

TABLE 2

| Sample | $SiO_2$ | CaO | $Al_2O_3$ | $K_2O$ | MgO | CaO + $SiO_2$ |
|---|---|---|---|---|---|---|
| C-1 | 72.8 | 24.9 | 1.1 | 0.6 | 0.6 | 97.7 |
| C-2 | 71.2 | 28.1 | 0.33 | 0.06 | 0.17 | 99.3 |
| 1 | 70.7 | 28.8 | 0.26 | 0.03 | 0.13 | 99.5 |
| 2 | 70.6 | 28.9 | 0.28 | 0.04 | 0.16 | 99.5 |
| 3 | 70.6 | 28.5 | 0.55 | 0.12 | 0.19 | 99.1 |
| 4 | 70.5 | 28.4 | 0.69 | 0.18 | 0.23 | 98.9 |
| 5 | 70.3 | 29.1 | 0.36 | 0.05 | 0.17 | 99.4 |
| 6 | 69.5 | 30.0 | 0.27 | 0.04 | 0.15 | 99.5 |
| 7 | 69.4 | 30.1 | 0.32 | 0.03 | 0.15 | 99.5 |
| 8 | 67.7 | 31.9 | 0.25 | 0.03 | 0.15 | 99.6 |

TABLE 2-continued

| Sample | SiO$_2$ | CaO | Al$_2$O$_3$ | K$_2$O | MgO | CaO + SiO$_2$ |
|---|---|---|---|---|---|---|
| 9 | 67.1 | 32.4 | 0.28 | 0.02 | 0.15 | 99.5 |
| 10 | 66.0 | 33.1 | 0.60 | 0.04 | 0.18 | 99.1 |
| 11 | 65.7 | 33.8 | 0.22 | 0.03 | 0.15 | 99.5 |
| 12 | 65.6 | 34.0 | 0.27 | 0.02 | 0.15 | 99.6 |
| 13 | 65.3 | 34.2 | 0.23 | 0.03 | 0.16 | 99.5 |
| 14 | 65.0 | 34.5 | 0.35 | 0.02 | 0.17 | 99.5 |
| 15 | 64.5 | 35.1 | 0.19 | 0.06 | 0.16 | 99.6 |
| 16 | 63.3 | 36.1 | 0.22 | 0.10 | 0.29 | 99.4 |
| 17 | 62.8 | 36.7 | 0.23 | 0.07 | 0.16 | 99.5 |
| 18 | 61.5 | 38.0 | 0.21 | 0.09 | 0.16 | 99.5 |
| 19 | 67.2 | 32.3 | 0.07 | 0.02 | 0.23 | 99.5 |
| 20 | 69.0 | 30.2 | 0.49 | 0.03 | 0.23 | 99.2 |
| 21 | 66.0 | 33.5 | 0.18 | 0.02 | 0.32 | 99.5 |
| 22 | 66.3 | 33.2 | 0.19 | 0.01 | 0.26 | 99.5 |
| C-23 | 66.3 | 33.2 | — | 0.004 | 0.03 | 99.5 |
| C-24 | 65.8 | 34.2 | 0.02 | 0.0 | 0.0 | 100.0 |
| 25 | 63.3 | 36.1 | 0.22 | 0.10 | 0.29 | 99.4 |
| 26 | 68.0 | 31.3 | 0.18 | 0.27 | 0.21 | 99.3 |
| 26b | 67.1 | 32.4 | 0.23 | 0.10 | 0.15 | 99.5 |
| P61-0488 | 66.2 | 33.3 | 0.15 | 0.01 | 0.26 | 99.5 |
| P61-0481 | 65.9 | 33.5 | 0.15 | 0.01 | 0.39 | 99.4 |
| C-3 | 60.7 | 38.9 | 0.26 | 0.07 | 0.17 | 99.6 |
| C-4 | 64.9 | 29.8 | 0.15 | 0.01 | 5.2 | 94.7 |
| C-5 | 60.7 | 38.8 | 0.23 | 0.12 | 0.17 | 99.5 |

TABLE 3

| Sample | Mullite Reactivity @ 1200° C. | Shrinkage at 1300° C. (24 hrs) | Shot content % wt | Mean Fibre diameter (μm) |
|---|---|---|---|---|
| C-1 | ○ | 2.0 | — | 6.9 |
| C-2 | ○ | 1.4 | 59.3 | — |
| 1 | — | 0.9 | 51.9 | 5.7 |
| 2 | ○ | 1.4 | 52.0 | — |
| 3 | ○ | 2.2 | 54.5 | — |
| 4 | ○ | 2.7 | 53.4 | 2.67 |
| 5 | ○ | 1.1 | 50.6 | — |
| 6 | ○ | — | 49.5 | — |
| 7 | ○ | 1.2 | 47.8 | — |
| 8 | ○ | 2.0 | 34.6 | — |
| 9 | ○ | 1.4 | 47.3 | — |
| 10 | ○ | 1.2 | 36.6 | 3.02 |
| 11 | ○ | 0.8 | 37.7 | — |
| 12 | X | 1.3 | 37.4 | 3.33 |
| 13 | X | 2.0 | 39.7 | — |
| 14 | X | — | 38.2 | 2.87 |
| 15 | — | 2.2 | — | — |
| 16 | — | 1.7 | — | — |
| 17 | — | 2.6 | — | — |
| 18 | — | 3.3 | — | — |
| 19 | — | 2.1 | — | — |
| 20 | — | 1.7 | — | — |
| 21 | — | 1.6 | — | 2.65 |
| 22 | — | 1.1 | — | 2.37 |
| 25 | — | 1.7 | — | — |
| 26 | — | 2.0 | — | — |
| P50 | ○ | 5.3 | — | — |
| C-3 | — | 8.6 | — | — |
| C-4 | X | 14.5 | — | — |
| C-5 | — | 5.6 | — | — |

Shrinkage @1300° C. for 24 Sours

The lowest shrinkage (best high temperature performance) was observed in samples 32 & 33. Sample 33 was a control sample with no additives, whereas Sample 32 has a slightly elevated MgO level, although in both samples, the sum of SiO$_2$ and CaO is greater than 99.0 wt %. Sample 32 appears to be an anomaly in the correlation between shrinkage and MgO content of Samples 30 to 33. Likewise, Example 37 is also considered a suspect result, with the shrinkage result expected to be below 4%. The results indicate that, in general, a higher CaO+SiO$_2$ level corresponds to fibre compositions with improved high temperature stability as measured by the shrinkage test.

Surface Crystallite Size

Figure 2:
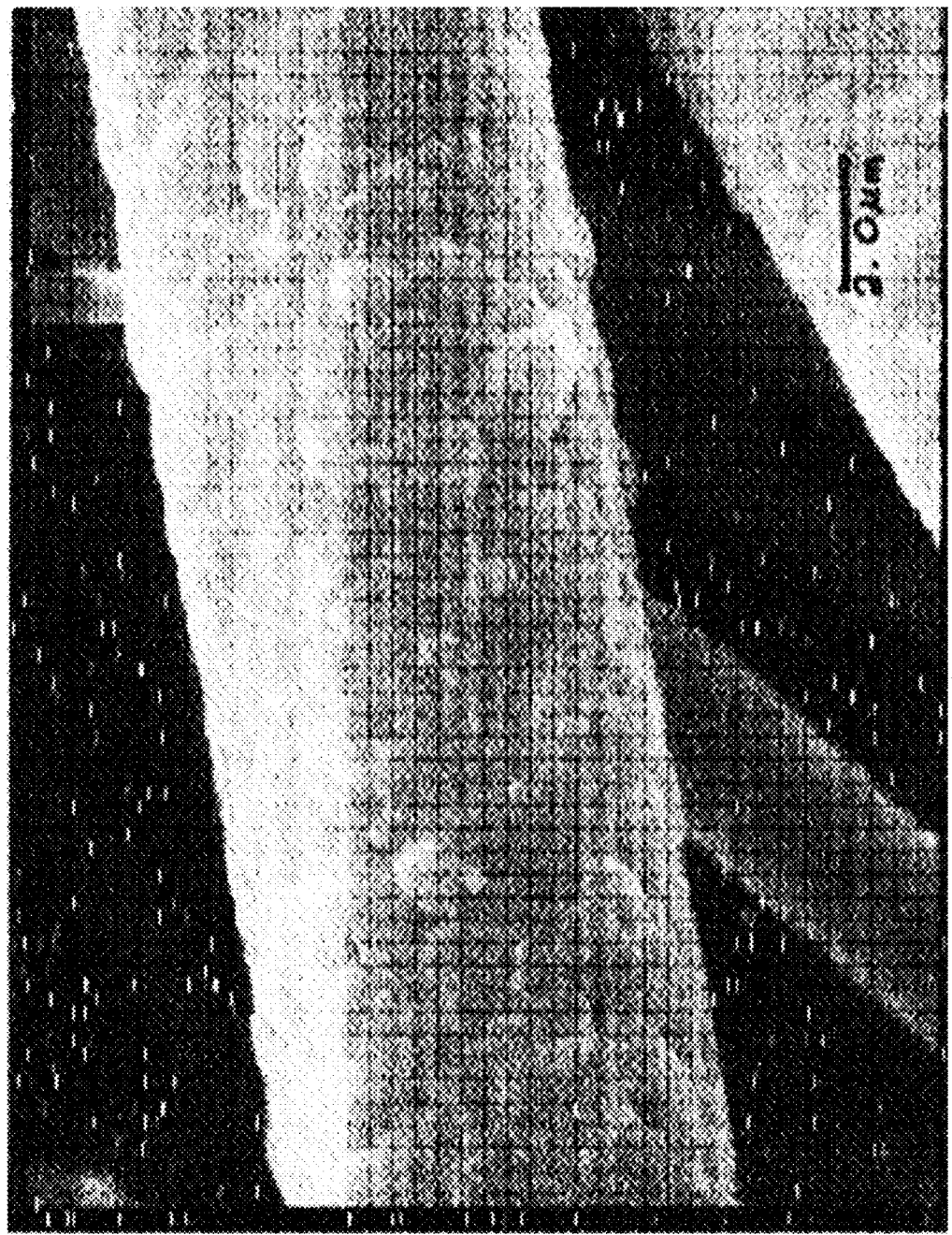
FIG. 2 is a SEM image of a fibre of the prior art (sample 23)

The ultra-pure raw materials were difficult to form fibres and when fibres were formed, yield was low and fibre diameter was large (e.g. >500 μm). As illustrated in FIG. 1, The surface of the fibres contain a mean crystallite grain size approaching 5 μm, with cracking also observed. The prevalence of surface crystallites was also noted on the high purity sample of the prior art (FIG. 2; Sample C-23), with a mean crystallite grain size of about 1 μm.

TABLE 4a

| # | SiO$_2$ | CaO | Al$_2$O$_3$ | K$_2$O | MgO | ZrO$_2$ | TiO$_2$ | CaO + SiO$_2$ | Static Solubility (pH 7.4) ppm | Shrinkage at 1300° C. |
|---|---|---|---|---|---|---|---|---|---|---|
| C-27 | 59.9 | 35.2 | 0.34 | 0.10 | 4.31 | 0.00 | — | 95.1 | 380 | 24.1 |
| 28 | 62.4 | 35.4 | 0.24 | 0.13 | 1.66 | 0.00 | — | 97.8 | 265 | 6.1 |
| 29 | 62.6 | 35.7 | 0.23 | 0.06 | 1.35 | 0.00 | — | 98.3 | 375 | 11.3 |
| 30 | 65.7 | 33.1 | 0.19 | 0.09 | 0.97 | 0.00 | — | 98.8 | 294 | 7.0 |
| 31 | 65.4 | 33.4 | 0.20 | 0.08 | 0.82 | 0.00 | — | 98.8 | 270 | 3.4 |
| 32 | 66.1 | 33.0 | 0.19 | 0.10 | 0.56 | 0.00 | — | 99.1 | 289 | 1.7 |
| 33 | 66.1 | 33.4 | 0.18 | 0.05 | 0.25 | 0.00 | — | 99.5 | 548 | 2.6 |
| C-34 | 63.4 | 34.9 | 0.84 | 0.08 | 0.47 | 0.32 | — | 98.3 | 301 | 5.7 |
| C-35 | 65.5 | 32.6 | 1.48 | 0.13 | 0.21 | 0.00 | — | 98.1 | 167 | 6.6 |
| C-36 | 65.5 | 33.1 | 1.04 | 0.18 | 0.20 | 0.00 | — | 98.6 | 208 | 4.1 |
| 37 | 65.5 | 33.6 | 0.56 | 0.14 | 0.26 | 0.00 | — | 99.1 | 249 | 5.0 |
| P40 | 66.0 | 31.8 | 0.45 | 0.04 | 0.79 | 0.71 | 0.03 | 97.8 | 140 | 4.0 |
| P41 | 66.4 | 31.8 | 0.17 | 0.04 | 0.89 | 0.03 | 0.66 | 98.2 | 235 | 5.5 |
| P47 | 67.2 | 31.8 | 0.17 | 0.41 | 0.24 | 0.03 | 0.02 | 99.0 | 259 | 1.9 |
| C-P50 | 63.5 | 28.6 | 0.17 | 0.31 | 0.23 | 7.2 | 0.03 | 92.1 | 50 | 5.3 |

As indicated in Table 4a, higher totals of CaO+SiO$_2$ tend to correspond to higher high temperature performance and bio-solubility. Table 4b further discloses the correlation between high temperature performance and the MgO content, with lower MgO contents correlating with lower shrinkage of the fibres at 1300° C.

Static Solubility

As indicated in Table 4a, increasing amounts of ZrO$_2$ (see samples C-32, P40 and C-P50) results in a reduction in bio-solubility of the fibres.

TABLE 4b

| # | SiO$_2$ | CaO | Al$_2$O$_3$ | K$_2$O | MgO | ZrO$_2$ | CaO + SiO$_2$ | Shrinkage at 1300° C. |
|---|---|---|---|---|---|---|---|---|
| 38 | 65.36 | 33.72 | 0.17 | 0.02 | 0.76 | 0.00 | 99.09 | 3.8 |
| 39 | 65.20 | 34.05 | 0.16 | 0.01 | 0.58 | 0.00 | 99.25 | 2.7 |
| 40 | 65.23 | 34.12 | 0.15 | 0.01 | 0.51 | 0.00 | 99.35 | 2.2 |
| 41 | 65.50 | 33.65 | 0.16 | 0.01 | 0.66 | 0.00 | 99.15 | 3.2 |
| 42 | 65.44 | 33.77 | 0.14 | 0.01 | 0.58 | 0.01 | 99.21 | 2.9 |
| 43 | 65.43 | 33.88 | 0.14 | 0.01 | 0.52 | 0.01 | 99.31 | 2.2 |
| 44 | 65.46 | 33.87 | 0.15 | 0.01 | 0.47 | 0.01 | 99.33 | 3.1 |
| 45 | 65.56 | 33.75 | 0.24 | 0.02 | 0.41 | 0.02 | 99.31 | 2.2 |
| 46 | 65.51 | 33.90 | 0.14 | 0.01 | 0.37 | 0.01 | 99.41 | 2.1 |
| 47 | 65.72 | 33.68 | 0.18 | 0.01 | 0.36 | 0.01 | 99.40 | 1.8 |
| 48 | 65.87 | 33.59 | 0.17 | 0.02 | 0.32 | 0.01 | 99.45 | 1.8 |
| 49 | 65.93 | 33.48 | 0.15 | 0.01 | 0.39 | 0.01 | 99.41 | 1.9 |
| 50 | 65.98 | 33.46 | 0.18 | 0.02 | 0.32 | 0.01 | 99.43 | 1.6 |
| 51 | 66.16 | 33.36 | 0.15 | 0.01 | 0.29 | 0.01 | 99.52 | 1.4 |
| 52 | 66.33 | 33.25 | 0.14 | 0.01 | 0.27 | 0.01 | 99.58 | 1.2 |
| 53 | 66.25 | 33.30 | 0.15 | 0.01 | 0.26 | 0.01 | 99.55 | 1.4 |
| 54 | 65.56 | 33.84 | 0.14 | 0.01 | 0.41 | 0.01 | 99.40 | 1.3 |
| 55 | 66.26 | 33.22 | 0.19 | 0.01 | 0.26 | 0.01 | 99.48 | 1.1 |

Figure 3A:
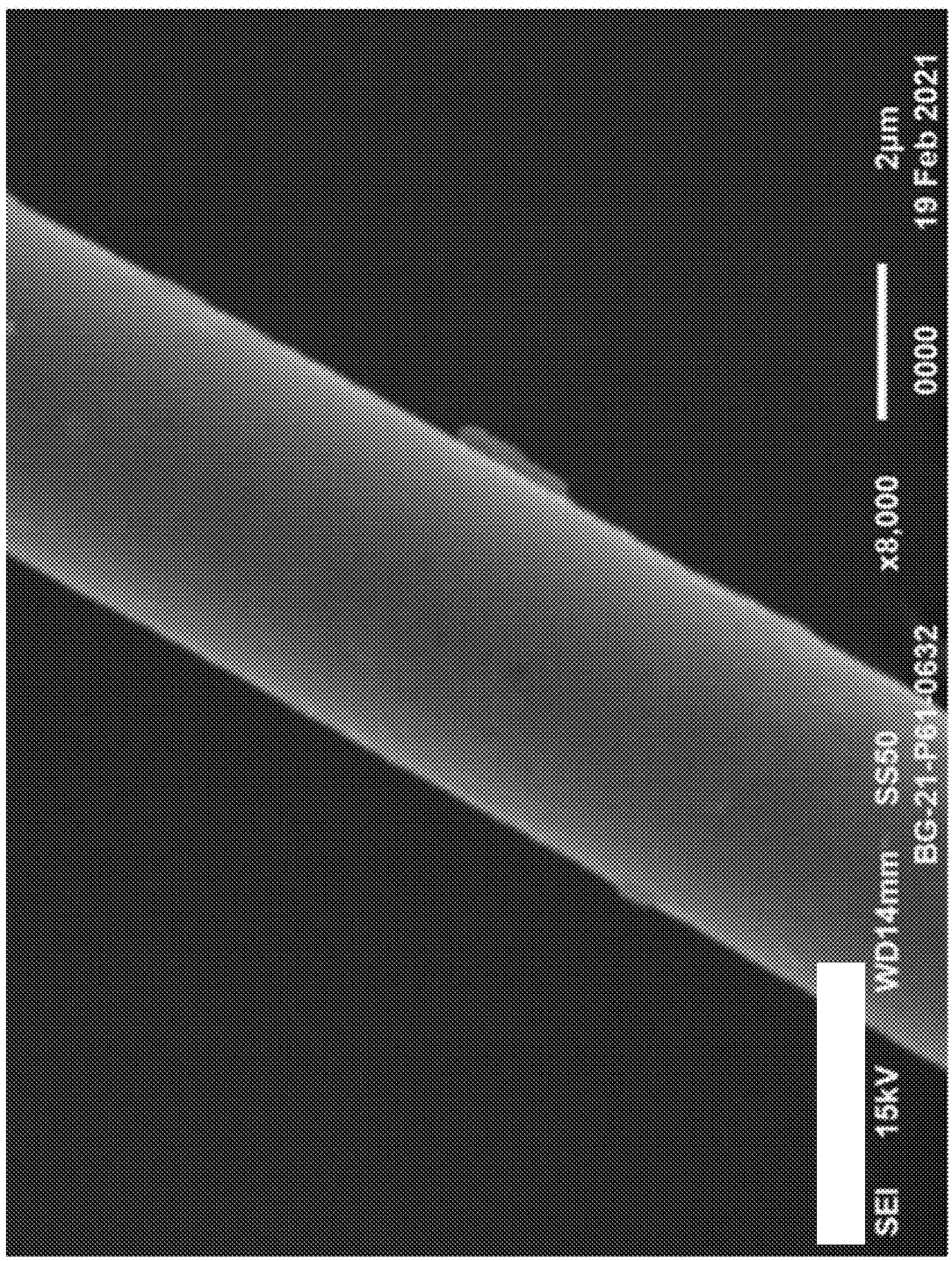
FIGS. 3a & 3b are SEM images of a fibre from sample 19
Figure 3B:
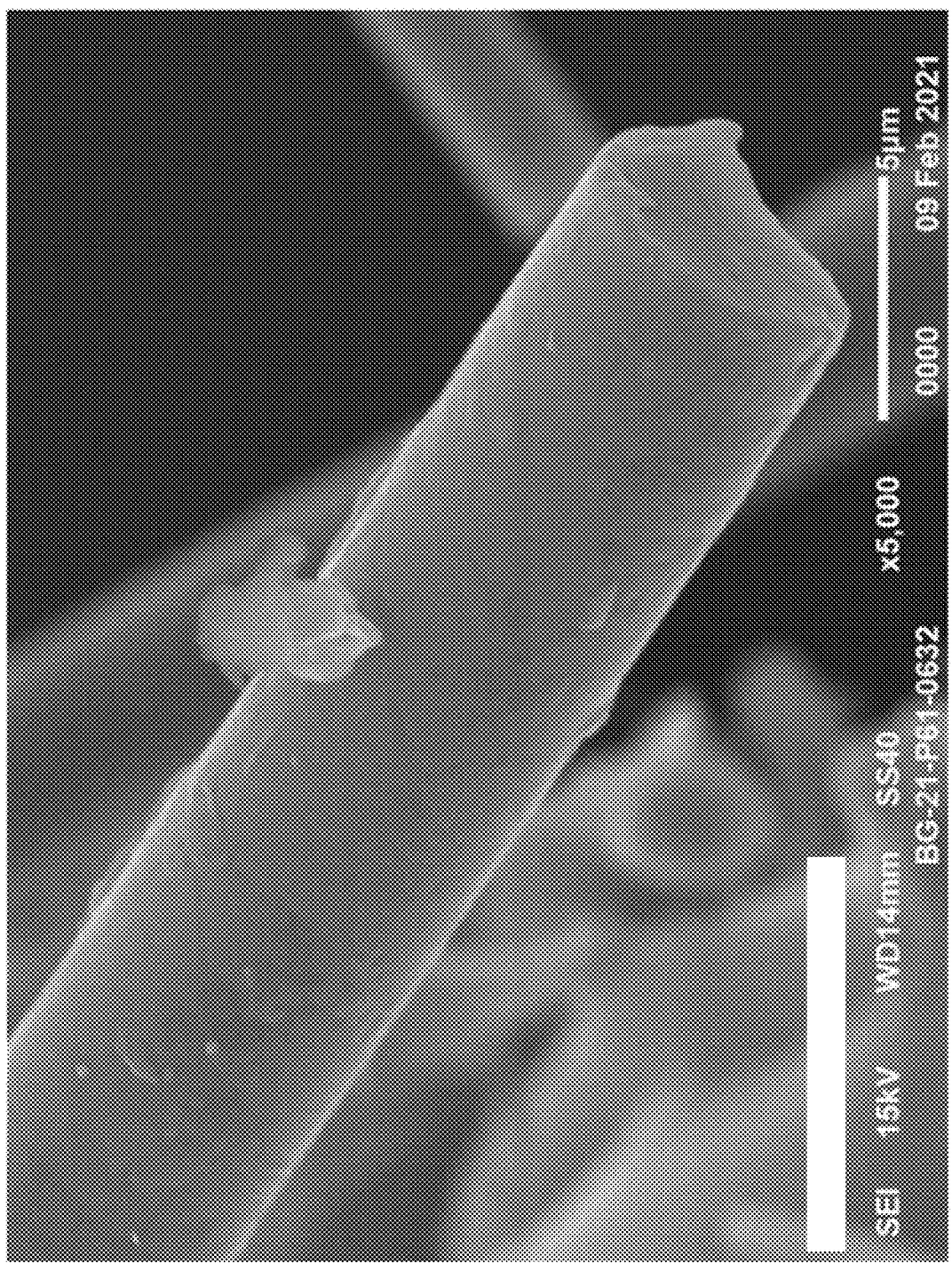
Figure 3C:
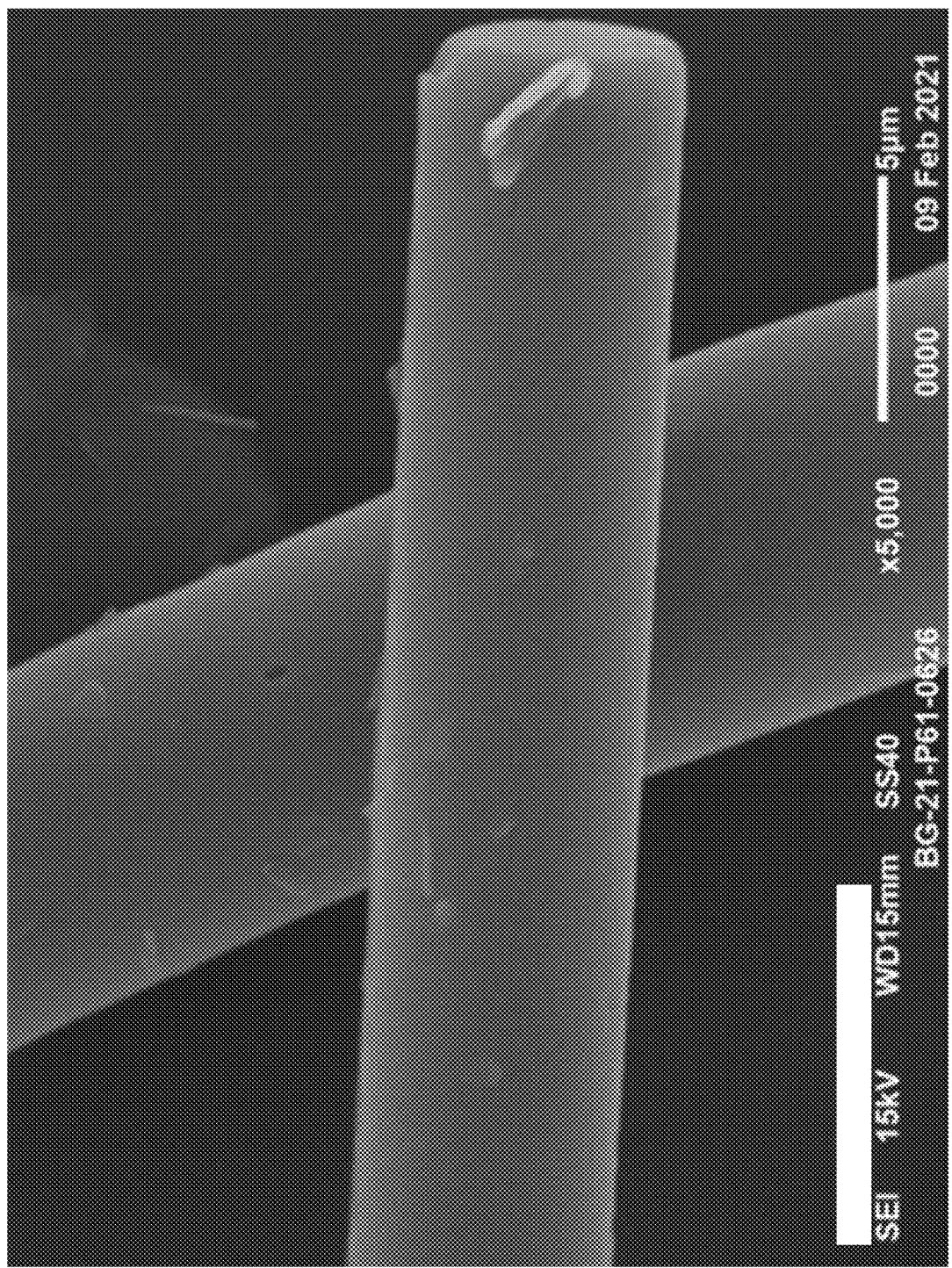
FIG. 3c is a SEM image of a fibre from sample 31
Figure 3D:
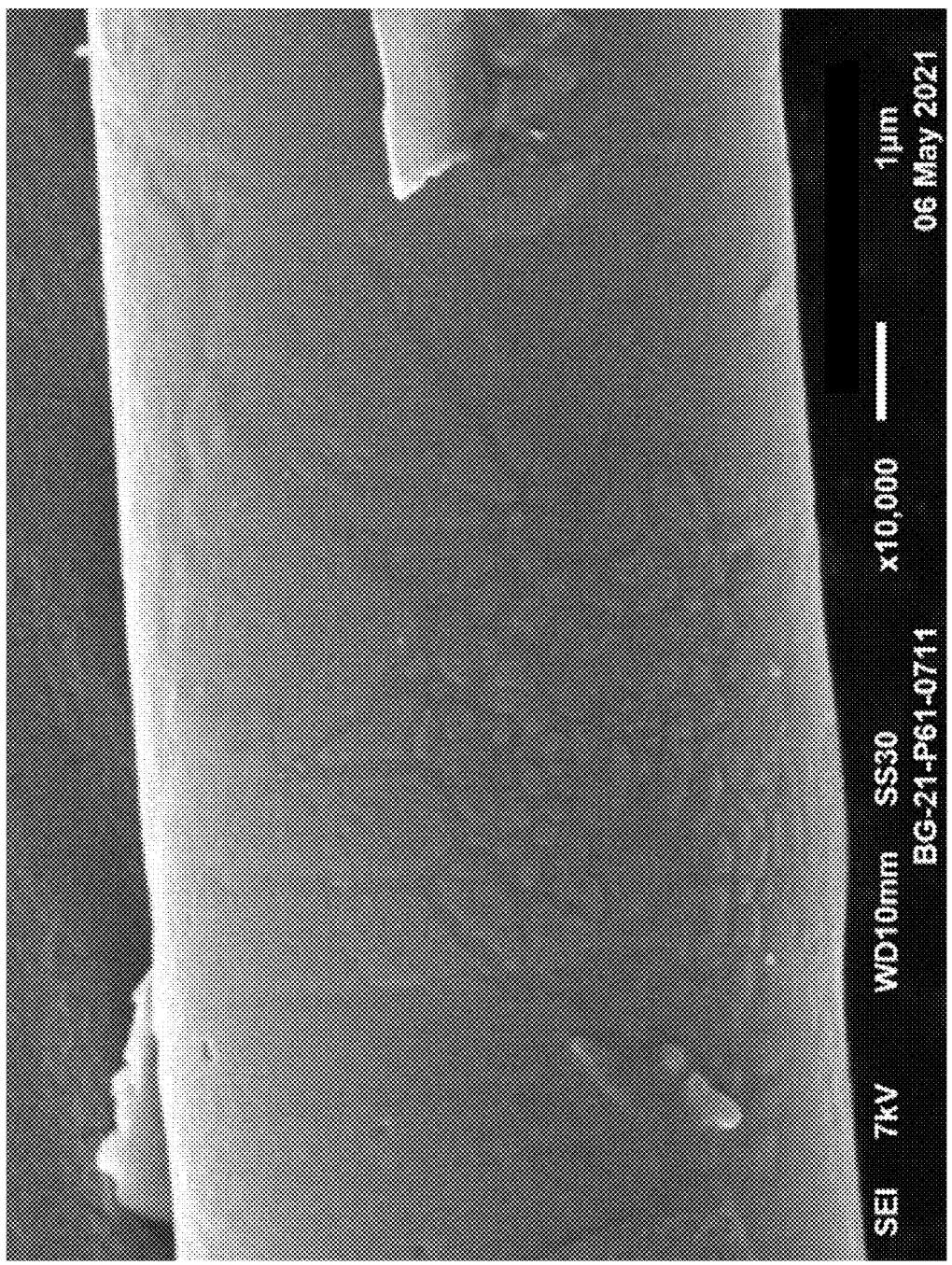
FIG. 3d is a SEM image of a fibre from sample 29
Figure 4A:
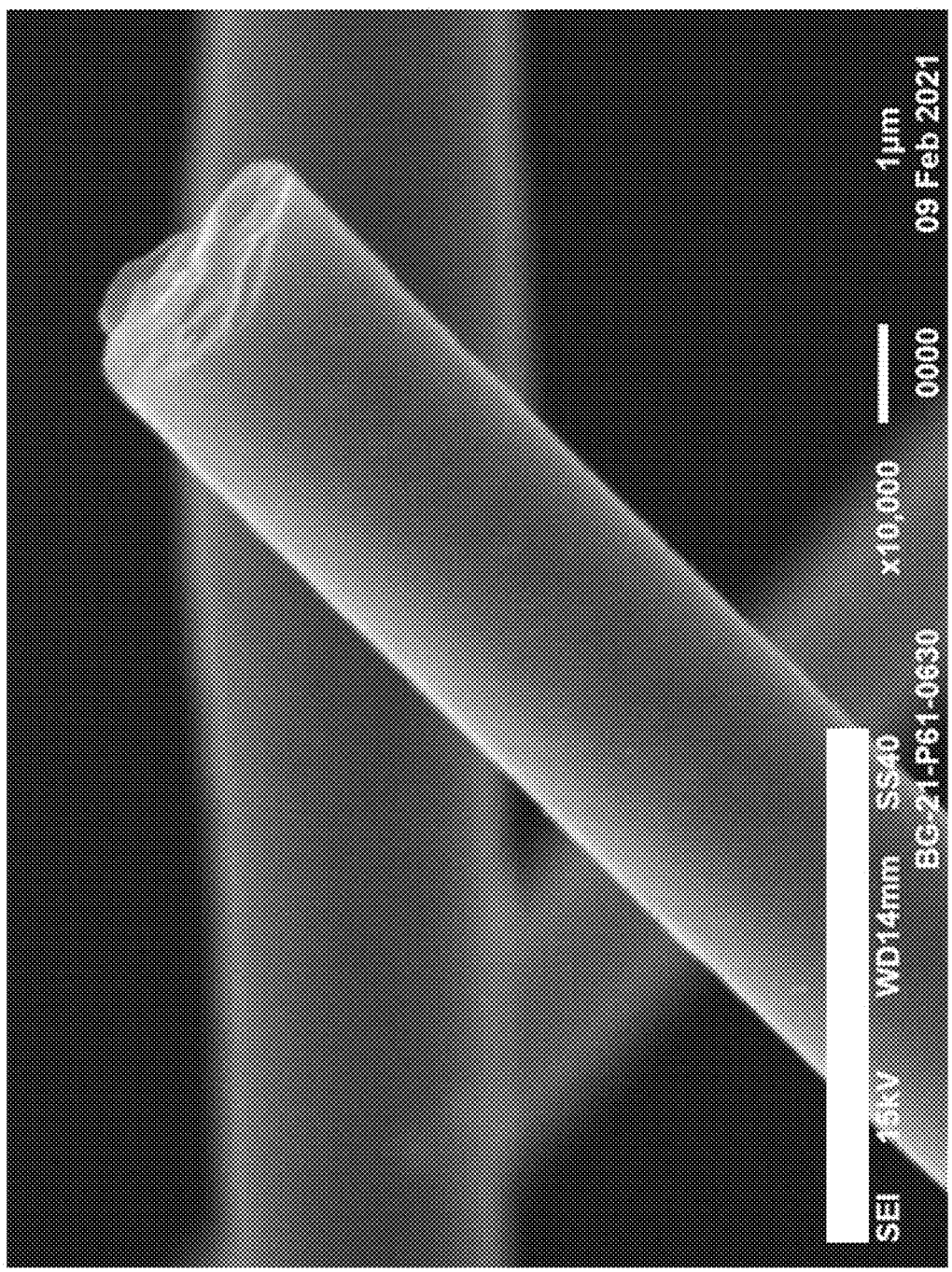
FIG. 4a is a SEM image of a fibre from sample 22
Figure 4B:
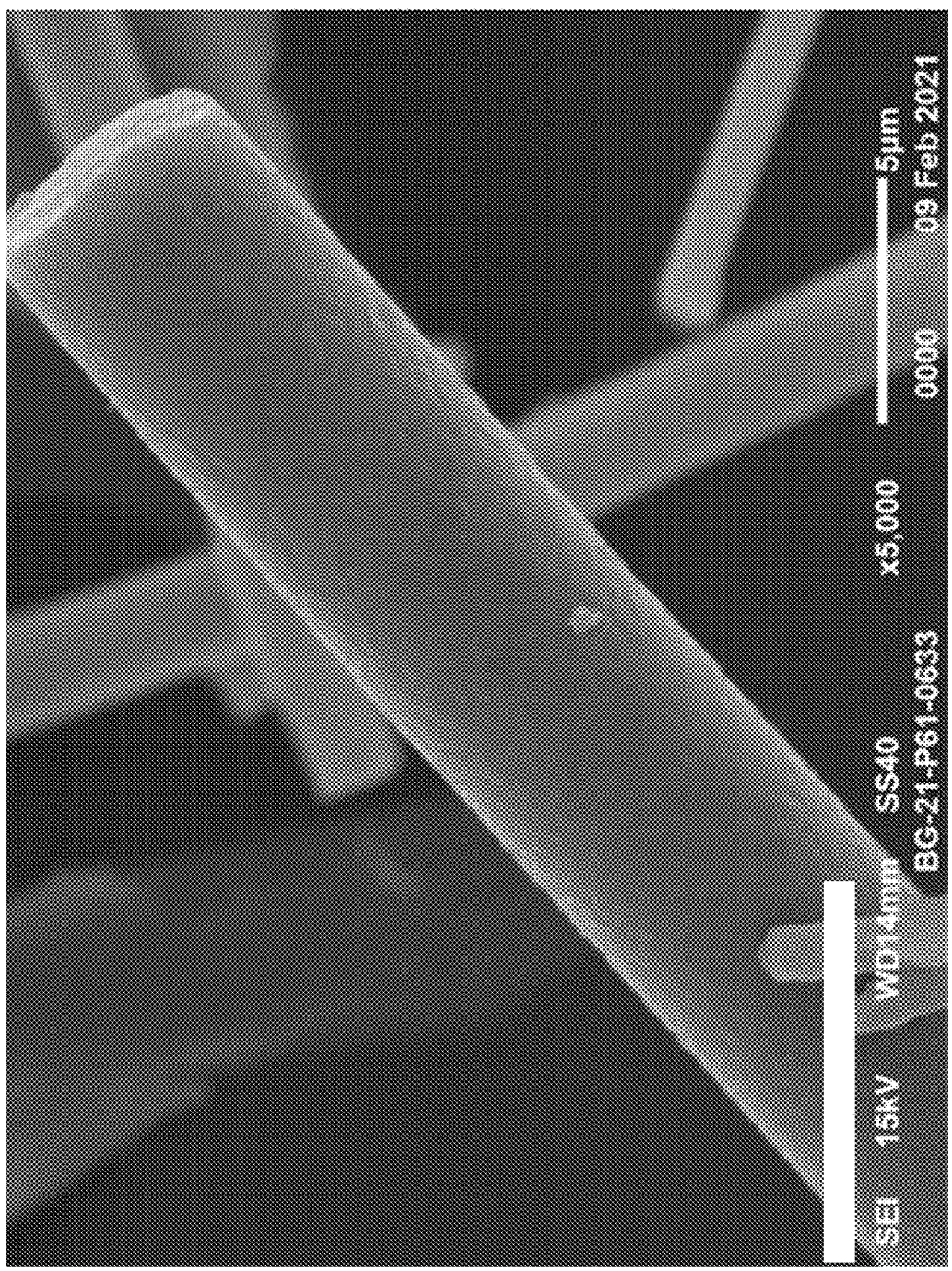
FIG. 4b is a SEM image of a fibre from sample 20
Figure 4C:
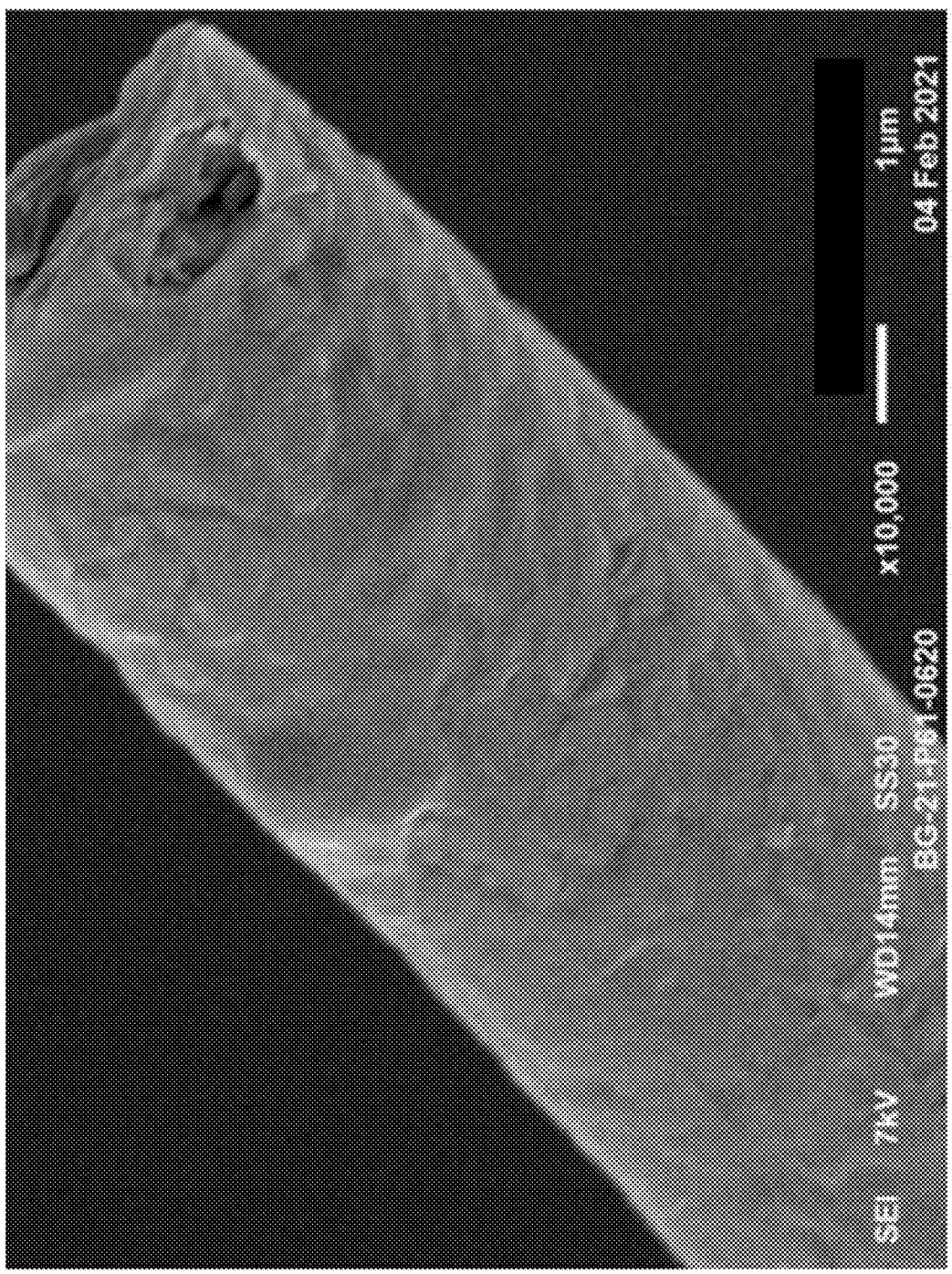
FIG. 4c is a SEM image of a fibre from sample 4
Figure 4D:
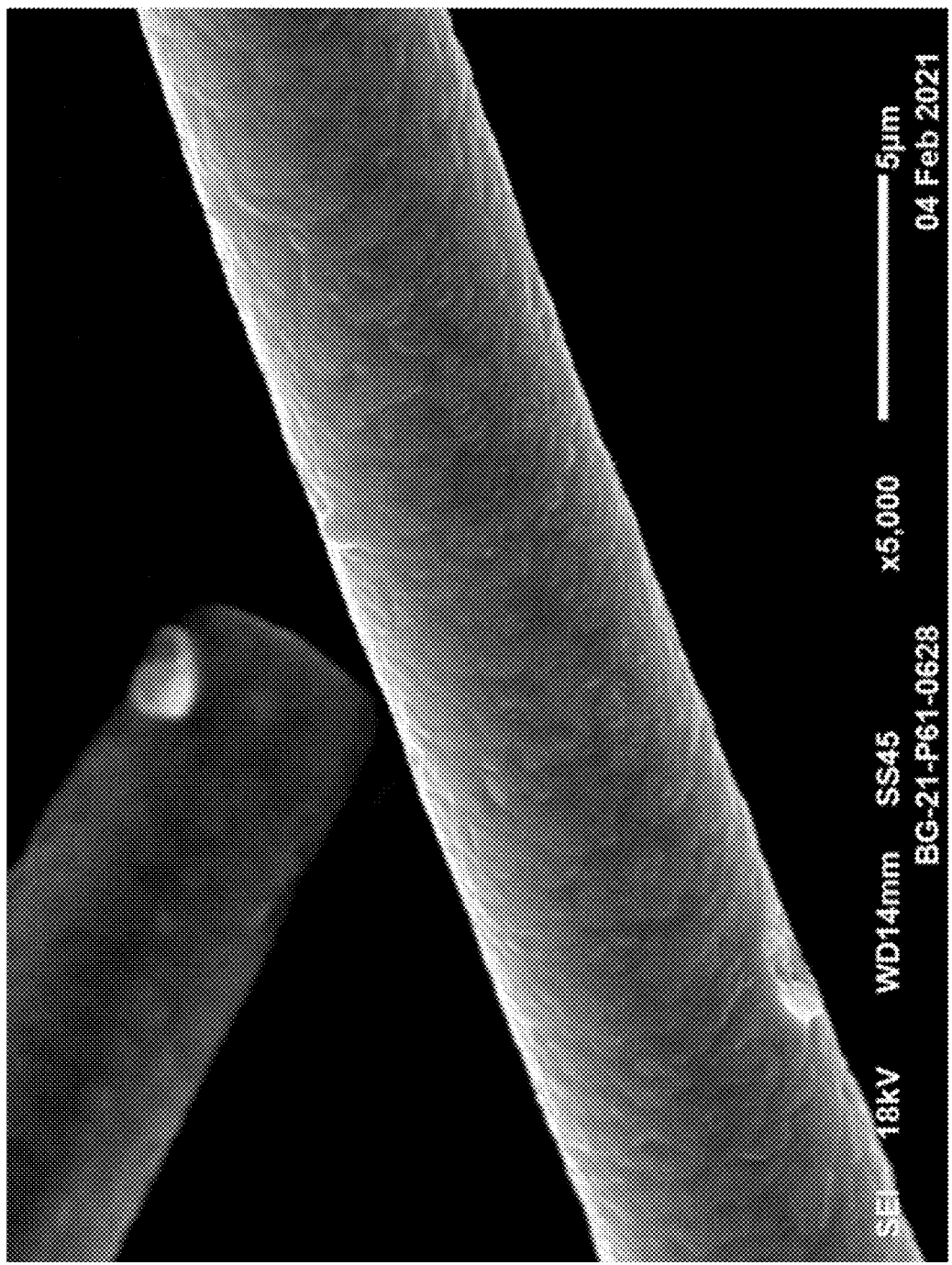
FIG. 4d is a SEM image of a fibre from sample 36
Figure 5A:
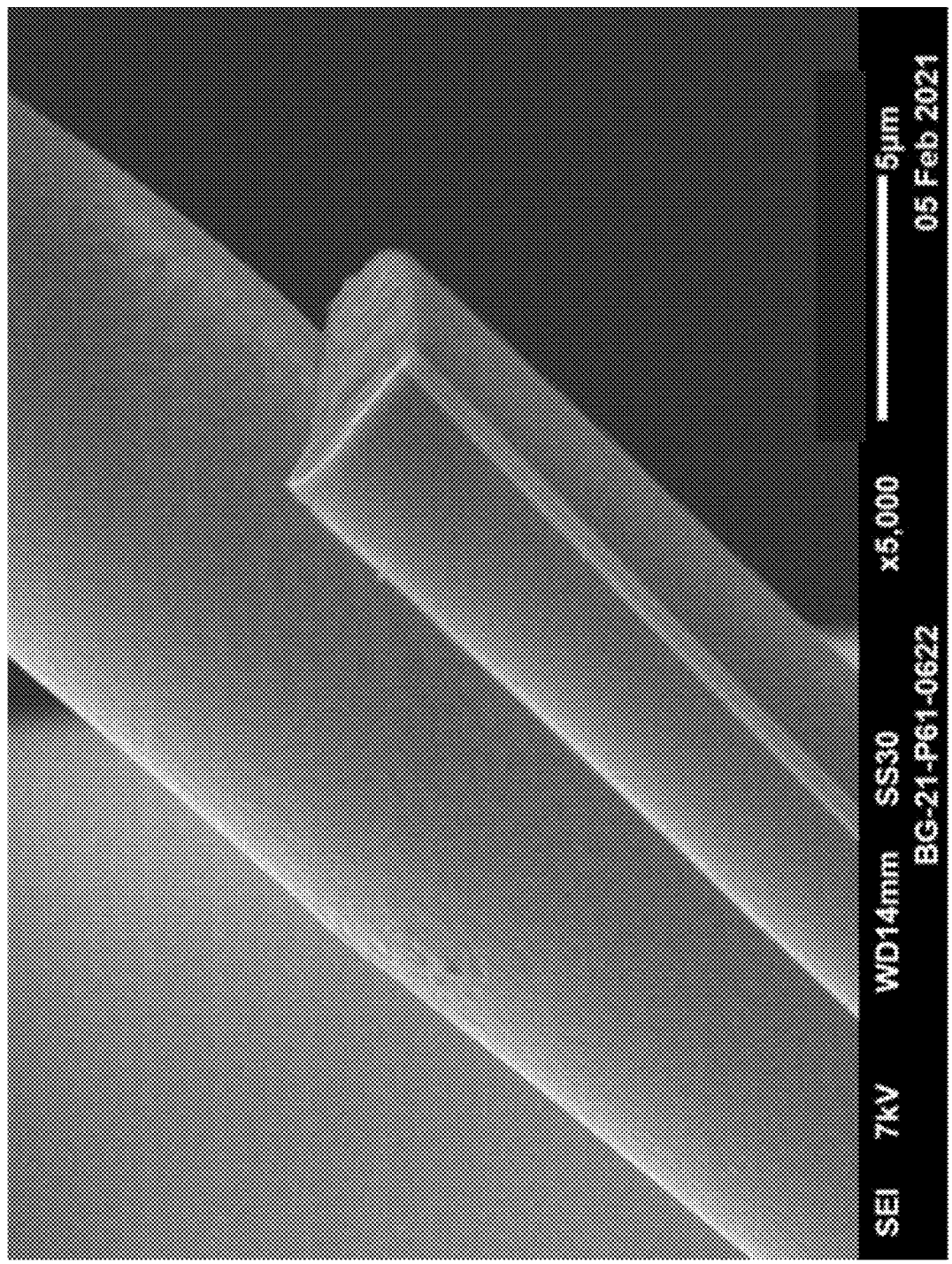
FIG. 5a is a SEM image of a fibre from sample 8
Figure 5B:
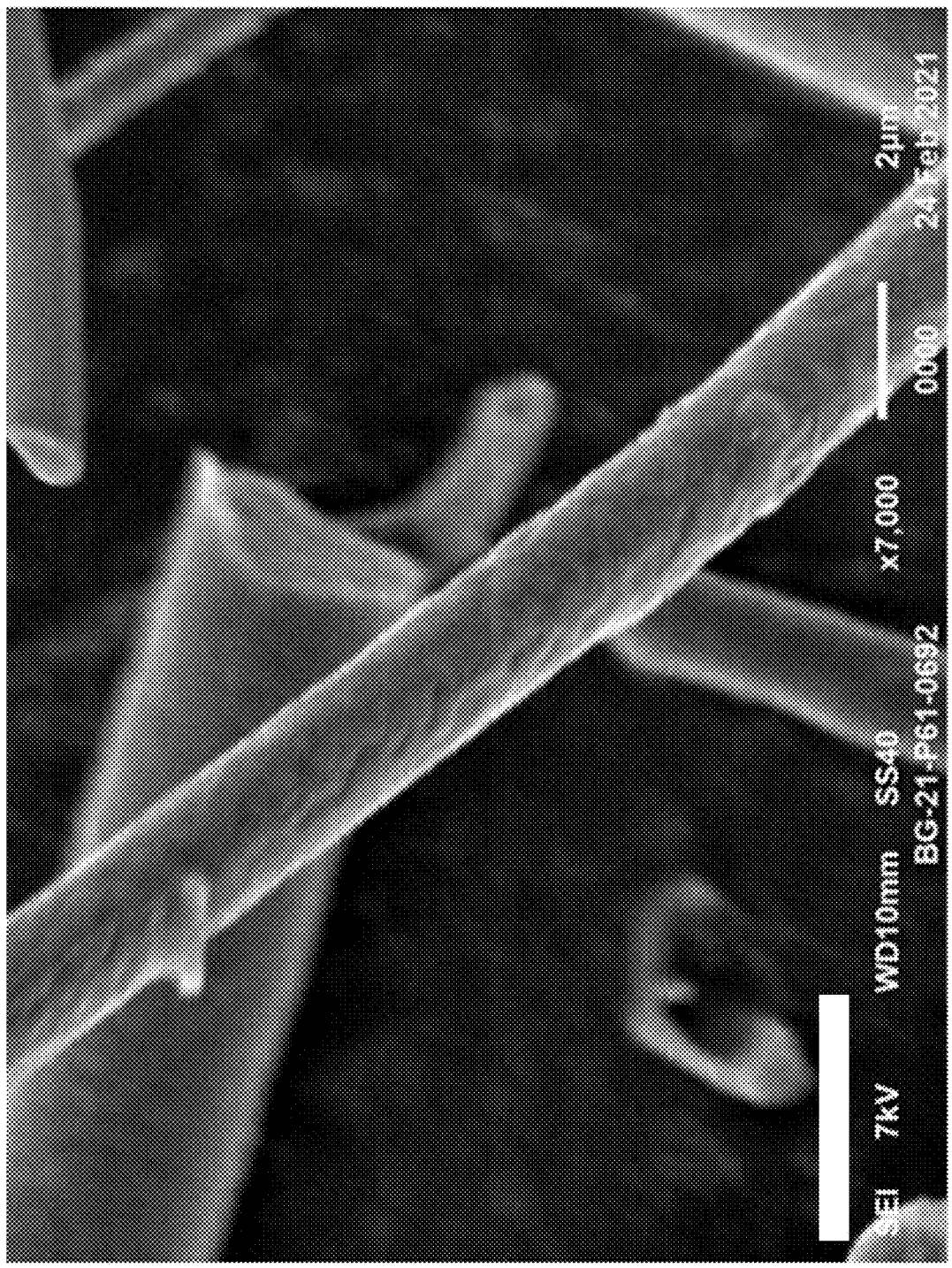
FIG. 5b is a SEM image of sample 26

The effect of the additional of MgO is illustrated in FIGS. 3a to 3d, with sample 19 (FIGS. 3a & 3b) and sample 31 (FIG. 4) representing a composition with MgO being the predominant minor oxide component. FIGS. 3b & 3d also illustrate examples of surface imperfections, including surface platelets, which are distinct from the regularity and form of the crystallites of FIG. 2. The results indicate that MgO up to at least 4.3 wt % is able to suppress crystallite growth at 1100° C., although increasing MgO levels also result in an increase in fibre shrinkage, with MgO contents in excess of 2 wt % being less suitable for continuous use applications at or above 1200° C. (Table 5). The effect of increased levels of Al$_2$O$_3$ are illustrated in FIGS. 4a to 4d, with a mean crystallite size of almost 1 μm obtained with an Al$_2$O$_3$ content of 1.04 wt % (sample 36), with CaO+SiO$_2$ wt % of 98.6 wt %. The effect of K$_2$O content is illustrated in FIG. 5a (sample 8) and 5b (sample 26), with the increase in K$_2$O content from 0.03 wt % (sample 8) to 0.27 wt % (sample 26) corresponding to a slight increase in crystallite size from below the detection limit (<0.4 μm) to 0.54 μm. Although samples P42 and P47 indicate elevated levels of K$_2$O up to about 0.5 wt % are still able to obtain a low crystallite size (<0.4 μm) for their compositional matrix.

The addition of 0.66 wt % TiO$_2$ and 0.89 wt % MgO (P41) resulted in poor shrinkage performance at 1300° C., with the TiO$_2$ component appearing to contribute most to this result. P40 had a similar MgO content to P41, but with ZrO$_2$ additional having a lower impact compared to TiO$_2$ upon shrinkage performance at 1300° C. Whilst the effect of an additive/impurity or combinations thereof may be specific to the additive/impurity, the inorganic fibre composition may be readily configured, through testing the sensitivity of additives/impurities, to obtain the required high temperature performance in terms of shrinkage and/or grain crystallite size.

TABLE 5

| Example | Shrinkage at 1200° C. (24 hrs) | Shrinkage at 1300° C. (24 hrs) | Grain size (μm) @ 1100° C. (24 hrs) | % wt of largest minor component |
|---|---|---|---|---|
| 4 | — | 2.7 | 0.47 | 0.69 Al$_2$O$_3$ |
| 7 | — | 1.2 | <0.4 | 0.32 Al$_2$O$_3$ |
| 8 | — | 0.8 | <0.4 | 0.25 Al$_2$O$_3$ |
| 11 | — | 1.4 | <0.4 | 0.22 Al$_2$O$_3$ |
| 19 | — | 2.1 | <0.4 | 0.23 MgO |
| 20 | — | 1.7 | 0.48 | 0.49 Al$_2$O$_3$ |
| 21 | — | 1.6 | <0.4 | 0.32 Al$_2$O$_3$ |
| 22 | — | 1.1 | <0.4 | 0.26 Al$_2$O$_3$ |
| C-23 | — | — | 0.94 | 0.03 MgO |
| C-24 | — | — | 4.93 | 0.02 Al$_2$O$_3$ |
| 25 | — | 1.7 | 0.48 | 0.29 MgO |
| 26 | — | 2.0 | 0.54 | 0.27 K$_2$O |
| 27 | 10.6 | 24.1 | <0.4 | 4.31 MgO |
| 28 | 3.4 | 6.1 | <0.4 | 1.66 MgO |
| 29 | 4.5 | 11.3 | <0.4 | 1.35 MgO |
| 30 | 1.5 | 7.0 | <0.4 | 0.97 MgO |
| 31 | — | 3.4 | <0.4 | 0.82 MgO |
| 32 | — | 1.7 | <0.4 | 0.56 MgO |
| 33 | — | 2.6 | — | 0.2 MgO |
| C-34 | — | 5.7 | 0.94 | 0.84 Al$_2$O$_3$ |
| C-35 | — | 6.6 | — | 1.48 Al$_2$O$_3$ |
| C-36 | — | 4.1 | 0.90 | 1.04 Al$_2$O$_3$ |
| 37 | — | 5.0 | 0.51 | 0.56 Al$_2$O$_3$ |
| P40 | 1.4 | 4.0 | 0.53 | 0.79 MgO |
| P41 | 1.8 | 5.5 | 0.77 | 0.89 MgO |
| P47 | 1.1 | 1.9 | <0.4 | 0.41 K$_2$O |

The results confirm that either too little or too much minor components within the composition may lead to elevated crystallite size, which is related to a deterioration in high temperature mechanical performance. In particular, MgO has been shown to inhibit crystallite growth, whilst Al$_2$O$_3$ has been demonstrated to promote crystallite growth. Apart from the main incidental impurities of Al$_2$O$_3$, MgO and K$_2$O, the XRF analysis measured the metal oxides listed in Table 6. The maximum and minimum incidental impurity level of each of the metal oxides is provided. Typically, these minor incidental impurities are less than 0.3 wt % or less than 0.25 wt % or less than 0.20 wt %; and at least 0.10 wt %.

The person skilled in the art may readily determine the levels of specific groups or specific other components at which crystallite growth is promoted, without undue experimentation. Raw materials with varying other components (i.e. impurity) profiles may be used, when other components detrimental to crystallite growth, and hence high temperature performance, are controlled to designated levels.

As such, the inorganic fibre composition may be configured to obtain the formation of surface crystallite grains, upon heat treatment at 1100° C. for 24 hours, having an average crystallite size of 0.90 μm or less.

TABLE 6

| Incidental impurities | Max level (% wt) | Min level (% wt) |
|---|---|---|
| BaO | 0.01 | 0.00 |
| Cr$_2$O$_3$ | 0.02 | 0.00 |
| Fe$_2$O$_3$ | 0.13 | 0.08 |
| HfO$_2$ | 0.00 | 0.00 |
| La$_2$O$_3$ | 0.07 | 0.00 |
| Mn$_3$O$_4$ | 0.00 | 0.00 |
| Na$_2$O | 0.03 | 0.00 |
| P$_2$O$_5$ | 0.00 | 0.00 |
| SrO | 0.03 | 0.00 |
| TiO$_2$ | 0.03 | 0.00 |
| V$_2$O$_5$ | 0.01 | 0.00 |
| SnO$_2$ | 0.01 | 0.00 |

TABLE 6-continued

| Incidental impurities | Max level (% wt) | Min level (% wt) |
|---|---|---|
| ZnO | 0.00 | 0.00 |
| $ZrO_2$ | 0.03 | 0.00 |

Thermal Conductivity of Bodies of Inorganic Fibres

Thermal conductivity of a body of melt formed fibres (e.g. a blanket or other product form) is determined by a number of factors including in particular:
Diameter of the fibres; and
"Shot" (unfiberised material) content Fine diameter fibres provide low thermal conductivity to a body of fibres by reducing the scope for conduction through the solid and permitting finer inter-fibre porosity increasing the number of radiate-absorb steps for heat to pass by radiation from one side of the body to the other.

The presence of shot in a blanket increases thermal conductivity of the blanket by increasing the scope for conduction through the solid. Shot also increases the density of a blanket. All else being equal, the lower the shot content, the lower the thermal conductivity and density. For two bodies of identical fibre content and chemistry, the body with the lower shot content will have both the lower density and lower thermal conductivity.

In reference to Table 7, inorganic fibres were produced with a fibre diameter between approximately 2.6 to 3.0 μm and a shot content between 32 and 41 wt %. From the dataset provided in Tables 7 & 8, there is no clear correlation between fibre characteristics and thermal conductivity, although samples P61-0481 and P61-0488, with the lowest thermal conductivity, were obtained from a commercial production line with lower shot level and an expected greater consistency in fibre diameter of about 3 μm diameter. Blankets derived from inorganic fibres with high $SiO_2$ content would be expected to have higher thermal conductivities due to the high shot content and fibre diameters associated with these compositions, as illustrated in Table 3. The resiliency of the inorganic fibres (Table 7) were seen to generally increase with increasing $SiO_2$ content.

Sample P61-0488 was produced at the Saint Marcellin site using melt spinning technology at commercial scale, with production conditions optimised to reduce shot levels, which have an effect on the insulative properties of the fibre. The inorganic fibre may be formed into an entangled blanket, typically using a needling technique. Blankets are usually produced at density of at least 64 kg/m³, with standard commercial densities producible, such as 64 kg/m³, 96 kg/m³, 128 kg/m³, 160 kg/m³. The inorganic fibre may also be formed into high density modules up to 240 kg/m³. Table 9 illustrates the improvement in the insulative properties of a 128 kg/m³ blanket compared on a blanket produced from comparative example, C-1. The disclosed compositions of the present disclosure are able to form low fibre diameters and possess low shot content, contributing the excellent high temperature thermal insulative properties.

TABLE 7

| SAMPLE | Shot (>45 μm) % wt | SEM Fibre diameter (μm) | Resiliency (24 hr @1150° C.) % | Resiliency (24 hr @1200° C.) % |
|---|---|---|---|---|
| 8 | 34.6 | — | 69 | 64 |
| 10 | 36.6 | 3.02 | 69 | 66 |
| 12 | 32.5 | 2.65 | 68 | 66 |
| 13 | 40.6 | — | 68 | 63 |
| 14 | 38.3 | 2.70 | 64 | 60 |
| 15 | 38.7 | 2.76 | — | — |
| P61-0488 | 32.1 | 3.01 | — | — |

TABLE 8

| | Conductivity (W/m.K) (ASTM C201) | | | | | | | | |
|---|---|---|---|---|---|---|---|---|---|
| SAMPLE | 400° C. | 600° C. | 800° C. | 1000° C. | 1100° C. | 1200° C. | Density Kg/m³ | Strength kPa | Density Kg/m³ |
| 10 | 0.08 | 0.13 | 0.22 | 0.33 | 0.40 | 0.47 | 88 | 35 | 91 |
| 12 | 0.07 | 0.12 | 0.21 | 0.32 | 0.39 | 0.46 | 96 | 50 | 95 |
| 13 | 0.08 | 0.13 | 0.20 | 0.28 | 0.33 | 0.39 | 111 | 50 | 121 |
| 14 | 0.07 | 0.11 | 0.18 | 0.27 | 0.33 | 0.39 | 105 | 48 | 115 |
| 15 | 0.07 | 0.12 | 0.19 | 0.29 | 0.35 | 0.41 | 105 | 56 | 123 |
| P61-0488 | 0.07 | 0.11 | 0.17 | 0.24 | 0.28 | 0.32 | 128 | 60 | 132 |
| P61-0481 | 0.08 | 0.12 | 0.17 | 0.22 | 0.26 | 0.29 | 128 | 64 | 135 |

Heat Flow Test (ASTM C680-19 Heat Flow)

The insulation properties of 128 kg/m³ 200 mm thick blankets made from the composition of samples P61-0488 and C-1 respectively, were determined. A heat source was applied to one side (hot face) of the blanket. The opposing side of the blanket was initially held at 27° C. ambient temperature, with no wind. After heating of the hot face to 1000° C., the opposing surface of the blanket (cold face) was recorded in Table 9. The results indicate the composition of the present disclosure achieves a reduction in heat loss of 15%.

TABLE 9

| Sample | Cold face temperature (° C.) | Heat loss W/m² |
|---|---|---|
| P61-0488 | 73 | 553 |
| C-1 | 80 | 653 |

Bio-Solubility

Referring now to Table 10, there is shown data for bio-solubility testing. A 21 day static and long flow through solubility test in saline pH 7.4 was conducted on the compositions shown in Table 10. Two samples of each fibre composition were simultaneously tested, with the average results reported. The saline samples were analysed using the ICP method to measure the oxide dissolution levels in ppm level. The results confirm that the fibres have low biopersistence. A low biopersistence fibre composition is taken to be a fibre composition which has a dissolution rate, in the flow solubility test, of at least 150 ng/cm² hr or at least 170 ng/cm² hr or at least 200 ng/cm² hr.

The inorganic fibres under the present disclosure have comparable or improved bio-solubility in comparison with prior art fibre compositions C1 and C2. As indicated by the specific surface area measurements, fine fibre dimensions promote increased bio-solubility.

Summary of Results

The above results highlight that the fibre composition of the present disclosure is able to produce a refractory fibre with great utility without the need for the deliberate additional of significant amounts of additives to enhance one or more fibre properties. This unexpected result also enables refractory fibres to be produced with a lower carbon footprint due to the reduced number of raw materials required for its production.

TABLE 10

| Sample Description | Static Solubility (pH 7.4 saline) (total ppm) | Flow through Dissolution Rate (pH 7.4 saline) (ng/cm² hr) | Specific Surface Area (m²/g) |
|---|---|---|---|
| C-1 | 230 | 125 | 0.1652 |
| C-2 | 313 | 379 | 0.2526 |
| 11 | 378 | 348 | 0.2887 |
| 16 | 295 | 326 | 0.3375 |
| 17 | 370 | — | — |
| 18 | 208 | — | — |
| 19 | 333 | — | — |
| 20 | 292 | — | — |
| 26 | 473 | — | — |

Insulation or Sealant Systems

In some embodiments, the fibre of the present disclosure may be used as an insulation and/or sealant system in kilns, ovens and furnaces or other high temperature environments. The insulation or sealant system may comprise a layer of alumina rich material (e.g. mullite or refractory bricks) and a layer (e.g. blanket) of inorganic fibres. Insulation systems may be used in kilns used for:

glass and ceramic goods production;
chemical and petrochemical processes;
iron and steel production and transformation facilities; and
non ferrous metal production and transformation facilities The fibre may also be used as insulation in heat shields and pollution devices (e.g. catalytic converters), where the non-reactivity of the fibres is beneficial.

Figure 6:
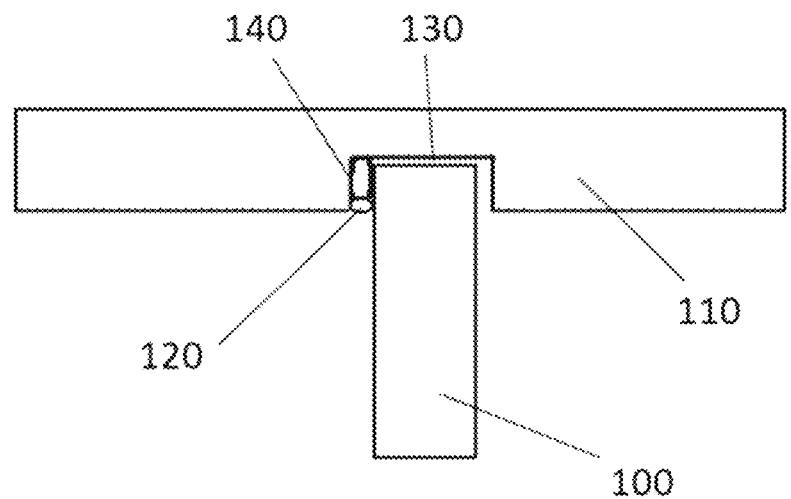
FIG. 6 is a schematic diagram of bake furnace sealant system

With reference to FIG. 6, there is an illustration of a sealant system from a section of a carbon bake furnace comprising a flue wall 100 and a headwall 110. A refractory mastic comprising inorganic fibre of the present disclosure is used as a corner seal 120 to prevent coke from the bake pit (not shown) from entering the vertical expansion joint 130. In some embodiments, the corner seal may also comprise an inorganic fibre blanket 140 of the present disclosure. The flue wall 100 and headwall 110, which are in contact with the inorganic fibre based refractory mastic and blanket (when present), are made from hot face refractory brick, which comprises an alumina content ranging from at least 42 wt % alumina to at least 58 wt % alumina. A sealant system comprising inorganic fibres of the present disclosure with a silica content of greater than 65.7 wt % is particularly beneficial in this application due to the fibre's non-reactivity with alumina and the fibre's low shrinkage characteristics at high temperatures.

Figure 7:
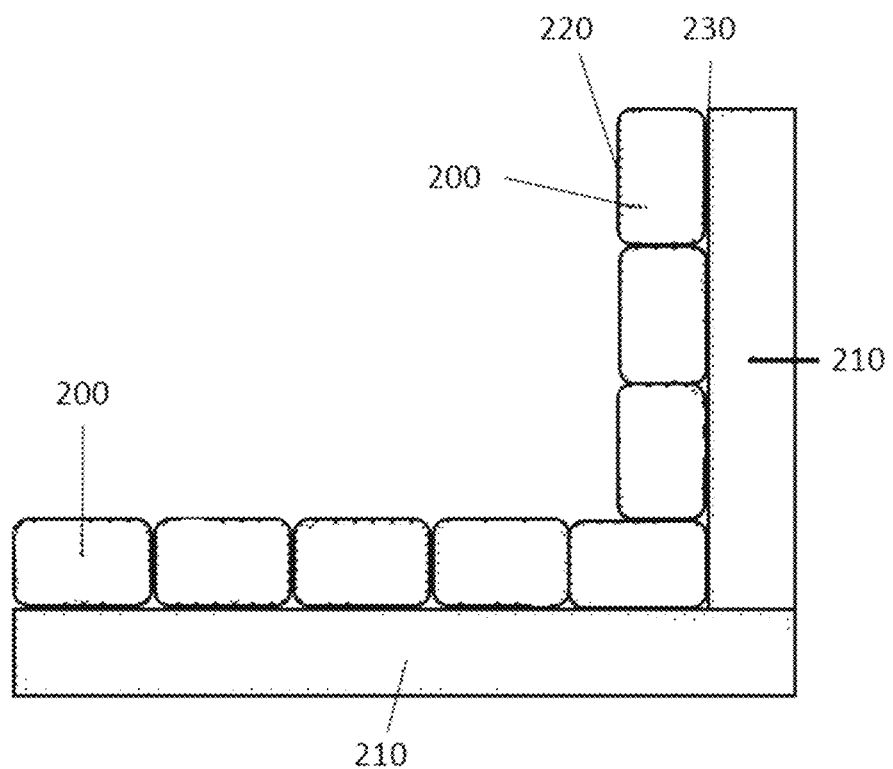
FIG. 7 is a schematic diagram of a furnace lined with inorganic fibres of the present disclosure.

An example of the furnace insulation system is illustrated in FIG. 7, in which insulating lining material 200 is attached to an inside surface of the furnace wall 210. The insulating material in use having a hot face 220 which faces inwardly of the furnace; and a cold face 230 in contact with the furnace wall 210, made of refractory bricks comprising alumina. The insulating lining material comprise inorganic fibres in the form of blankets, folded blanket modules or high density (e.g. up to 240 kg/m³) modules, such Pyro-Stack™ or Pyro-Bloc™ type modules available from Morgan Advanced Materials.

Other Potential Uses

The fibres of the present disclosure can be used, subject to meeting relevant performance criteria, for any purpose for which fibrous inorganic materials, and particularly alkaline earth silicate and aluminosilicate materials, have been used heretofore; and may be used in future applications where the fibre properties are appropriate. The fibres and products derived therefrom of the present disclosure may be used in applications which currently use commercially available products including, but not limited to SUPERWOOL® PLUS, SUPERWOOL®HT, SUPERWOOL® XTRA™, THERMFRAX®, INSULFRAX 1300 HT, ISOFRAX® 1260, ISOFRAX® 1300, ISOFRAX® 1400, ISOFRAX® LTX™, FINEFLEX BIO™, KCC CERAKWOOL New-Bio™ 1100, CERAKWOOL New-Bio™ 1300, MINYE HB®.

In the following reference is made to a number of patent documents relating to applications in which the fibres may be used, subject to meeting relevant performance criteria for the application. The fibres of the present disclosure can be used in place of the fibres specified in any of these applications subject to meeting relevant performance criteria. For example, the fibres may be used as:

bulk materials;
deshotted materials [WO2013/094113];
in a mastic or mouldable composition [WO2013/080455, WO2013/080456] or as part of a wet article [WO2012/132271];
as a constituent in needled or otherwise entangled [WO2010/077360, WO2011/084487] assemblies of materials, for example in the form of blanket, folded blanket modules, or high density fibre blocks [WO2013/046052];
as a constituent of non-needled assemblies of materials, for example felts, vacuum formed shapes [WO2012/132469], or papers [WO2008/136875, WO2011/040968, WO2012/132329, WO2012/132327];
as a constituent (with fillers and/or binders) of boards, blocks, and more complex shapes [WO2007/143067, WO2012/049858, WO2011/083695, WO2011/083696];
as strengthening constituents in composite materials such as, for example, fibre reinforced cements, fibre reinforced plastics, and as a component of metal matrix composites;
in support structures for fuel cells [WO2020047036] or catalyst bodies in pollution control devices such as automotive exhaust system catalytic converters and diesel particulate filters [WO2013/015083], including support structures comprising:
edge protectants [WO2010/024920, WO2012/021270];
microporous materials [WO2009/032147, WO2011019394, WO2011/019396];

organic binders and antioxidants [WO2009/032191];
intumescent material [WO2009/032191];
nanofibrillated fibres [WO2012/021817];
microspheres [WO2011/084558];
colloidal materials [WO2006/004974, WO2011/037617]
oriented fibre layers [WO2011/084475];
portions having different basis weight [WO2011/019377];
layers comprising different fibres [WO2012065052];
coated fibres [WO2010122337];
mats cut at specified angles [WO2011067598];
[NB all of the above features may be used in applications other than support structures for catalytic bodies]
as a constituent of catalyst bodies [WO2010/074711];
as a constituent of friction materials [e.g. for automotive brakes [JP56-16578]];
a component in insulation, fire protection or thermal runaway prevention materials in energy storage devices for fire protection [WO2011/060421, WO2011/060259, WO2012/068427, WO2012/148468, WO2012/148469, WO2013074968];
as insulation, for example;
  as insulation for ethylene crackers [WO2009/126593], hydrogen reforming apparatus [U.S. Pat. No. 4,690,690];
  as insulation in furnaces for the heat treatment of metals including iron and steel [U.S. Pat. No. 4,504,957];
  as insulation in apparatus for ceramics manufacturing.

The fibres may also be used in combination with other materials. For example the fibres may be used in combination with polycrystalline (sol-gel) fibres [WO2012/065052] or with other biosoluble fibres [WO2011/037634].

Bodies comprising the fibres may also be used in combination with bodies formed of other materials. For example, in insulation applications, a layer of material according to the present disclosure [for example a blanket or board] may be secured to a layer of insulation having a lower maximum continuous use temperature [for example a blanket or board of alkaline earth silicate fibres] [WO2010/120380, WO2011133778]. Securing of the layers together may be by any known mechanism, for example blanket anchors secured within the blankets [US4578918], or ceramic screws passing through the blankets [see for example DE3427918-A1].

Treatment of the Fibres

In formation of the fibres or afterwards they may be treated by applying materials to the fibres. For example:
lubricants may be applied to the fibres to assist needling or other processing of the fibres;
coatings may be applied to the fibres to act as binders;
coatings may be applied to the fibres to provide a strengthening or other effect, for example phosphates [WO2007/005836] metal oxides [WO2011159914] and colloidal materials such as alumina, silica and zirconia [WO2006/004974];
binders may be applied to the fibres to bind the fibres subsequent to incorporation in a body comprising such fibres.

Many variants, product forms, uses, and applications of the fibres of the present disclosure will be apparent to the person skilled in the art and are intended to be encompassed by this disclosure.

By providing biosoluble fibres having maximum continuous use temperature higher than alkaline earth silicate fibres, the present disclosure extends the range of applications for which biosoluble fibres may be used. This reduces the present need, for many applications, to use fibres that are not biosoluble.

For the avoidance of doubt it should be noted that in the present specification the term "comprise" in relation to a composition is taken to have the meaning of include, contain, or embrace, and to permit other ingredients to be present. The terms "comprises" and "comprising" are to be understood in like manner. It should also be noted that no claim is made to any composition in which the sum of the components exceeds 100%.

Where a patent or other document is referred to herein, its content is incorporated herein by reference to the extent permissible under national law.

It should be understood that usage of compositions of the names of oxides does not imply that these materials are supplied as such, but refers to the composition of the final fibre expressing the relevant elements as oxides. The materials concerned may be provided in whole or in part as mixed oxides, compounded with fugitive components (e.g. supplied as carbonates) or as non-oxide components.

The term metal oxides and/or non-oxides is inclusive of all forms of metal including phosphates, sulphates, halides or sulphides.

The invention claimed is:

1. A process for the manufacture of inorganic fibres comprising:
  (a) selecting a composition and proportion of each of the following raw materials:
    (i) silica sand;
    (ii) lime, said lime comprising at least 0.10 wt % magnesia; and
    (iii) optional additives comprising a source of oxides or non-oxides of one or more of the lanthanides series of elements, Li, Na, K, Sr, Sn, Ba, Cr, Fe, Zn, Y, Zr, Hf, Ca, B, P or combinations thereof;
  (b) mixing the silica sand; lime; and optional additives to form a mixture;
  (c) melting the mixture in a furnace;
  (d) shaping the molten mixture into inorganic fibres,
  wherein the raw material selection comprises composition selection and proportion selection of the raw materials to obtain an inorganic fibre composition comprising a range of from 61.0 wt % to 70.8 wt % silica; at least 0.10 wt % and less than 2.0 wt % magnesia; less than 2.0% incidental impurities; and no more than 2.0 wt % of metal oxides and/or metal non-oxides derived from said optional additives; with calcia providing the balance up to 100 wt %; and wherein the inorganic fibre composition comprises no more than 0.80 wt % $Al_2O_3$ derived from the incidental impurities and/or the optional additives; and
  wherein the composition selection and proportion selection of the raw materials is configured so the amount of magnesia in the fibre composition is sufficient to inhibit the formation of surface crystallite grains upon heat treatment at 1100° C. for 24 hours, said surface crystallite grains comprise an average crystallite size in a range of from 0.0 to 0.90 µm.

2. The process according to claim 1, wherein the amount of magnesia in the inorganic fibre composition is at least 0.20 wt %.

3. The process according to claim 1, wherein the amount of $Al_2O_3$ is no more than 0.70 wt %.

4. The process according to claim 1, wherein the amount of magnesia is no more than 0.85 wt %.

5. The process according to claim 1, wherein the inorganic fibre composition comprises no more than 1.8 wt % of metal oxides and/or metal non-oxides derived from said optional additives.

6. The process according to claim 1, wherein the inorganic fibre composition comprises no more than 1.0 wt % of metal oxides and/or metal non-oxides derived from said optional additives.

7. The process according to claim 1, wherein the inorganic fibre composition comprises no more than 0.6 wt % of metal oxides or metal non-oxides derived from said optional additives.

8. The process according to claim 1, wherein the inorganic fibre composition comprises no more than 0.2 wt % of metal oxides or metal non-oxides derived from said optional additives.

9. The process according to claim 1, wherein the inorganic fibre composition comprises no more than 0.1 wt % of metal oxides or metal non-oxides derived from said optional additives.

10. The process according to claim 1, wherein the raw materials consist of lime and silica sand.

11. The process according to claim 1, wherein the composition selection and proportion selection of the raw materials is configured such that a vacuum cast preform of the inorganic fibres comprises a shrinkage of 6.0% or less when exposed to 1300° C. for 24 hrs.

12. The process according to claim 1, wherein the raw material composition selection and proportion of said silica sand and lime is configured such that a vacuum cast preform of the inorganic fibres comprises a shrinkage of 4.0% or less when exposed to 1300° C. for 24 hrs.

13. The process according to claim 1, wherein the raw material composition selection and proportion of said silica sand and lime is configured such that a vacuum cast preform of the inorganic fibres comprises a shrinkage of 3.5% or less when exposed to 1300° C. for 24 hrs.

14. The process according to claim 1, wherein the composition selection and proportion selection of the raw materials is configured such that the proportion of silica and optional zirconia in the inorganic fibre composition comprises a range of from 65.7 wt % to 70.8 wt %.

15. The process according to claim 1, wherein the composition selection and proportion selection of the raw materials is configured such that the proportion of incidental impurities in the inorganic fibre composition is less than 1.5 wt %.

16. The process according to claim 1, wherein the composition selection and proportion selection of the raw materials is configured such that the proportion of incidental impurities in the inorganic fibre composition is less than 0.8 wt %.

17. The process according to claim 1, wherein the composition selection and proportion selection of the raw materials is configured such that the proportion of incidental impurities in the inorganic fibre composition is less than 0.6 wt %.

18. The process according to claim 1, wherein the composition selection and proportion selection of the raw materials is configured such that the proportion of incidental impurities and optional additives in the inorganic fibre composition is no more than 2.5 wt %.

19. The process according to claim 1, wherein the composition selection and proportion selection of the raw materials is configured such that the proportion of incidental impurities and optional additives in the inorganic fibre composition is no more than 2.2 wt %.

20. The process according to claim 1, wherein the composition selection of the raw materials involves doping amounts of selected incidental impurities into the raw materials to determine a shrinkage value of the resultant inorganic fibres when exposed to 1300° C. for 24 hrs and using the shrinkage value to determine a target composition selection range of the silica sand and lime.

21. The process according to claim 20, wherein the target composition selection range is used to select the silica sand and/or the lime.

22. The process according to claim 1, wherein the composition of the silica sand and/or lime is obtained through blending different batches of silica sand and/or lime to obtain the composition.

23. The process according to claim 1, wherein said lime comprises at least 0.37 wt % magnesia.

24. A process for the manufacture of inorganic fibres comprising:
(a) selecting a composition and proportion of each of the following raw materials:
(i) silica sand;
(ii) lime, said lime comprising at least 0.10 wt % magnesia; and
(iii) optional additives comprising a source of oxides or non-oxides of one or more of the lanthanides series of elements, Li, Na, K, Sr, Sn, Ba, Cr, Fe, Zn, Y, Zr, Hf, Ca, B, P or combinations thereof;
(b) mixing the silica sand; lime; and optional additives to form a mixture;
(c) melting the mixture in a furnace;
(d) shaping the molten mixture into inorganic fibres,
wherein the raw material selection comprises composition selection and proportion selection of the raw materials to obtain an inorganic fibre composition comprising a range of from 61.0 wt % to 70.8 wt % silica; at least 0.10 wt % and less than 0.85 wt % magnesia; less than 2.0% incidental impurities; and no more than 2.0 wt % of metal oxides and/or metal non-oxides derived from said optional additives; with calcia providing the balance up to 100 wt %; and wherein the inorganic fibre composition comprises no more than 0.70 wt % $Al_2O_3$ derived from the incidental impurities and/or the optional additives; and
the composition selection and proportion selection of the raw materials is configured so the amount of magnesia in the fibre composition is sufficient to inhibit the formation of surface crystallite grains upon heat treatment at 1100° C. for 24 hours, said surface crystallite grains comprise an average crystallite size in a range of from 0.0 to 0.90 μm.

25. The process according to claim 24, wherein a sum of $SiO_2$ and CaO is greater than or equal to 98.8 wt %.

26. A process for the manufacture of inorganic fibres comprising:
(a) selecting a composition and proportion of each of the following raw materials:
(i) silica sand;
(ii) lime, said lime comprising at least 0.10 wt % magnesia; and
(iii) optional additives comprising a source of oxides or non-oxides of one or more of the lanthanides series of elements, Li, Na, K, Sr, Sn, Ba, Cr, Fe, Zn, Y, Zr, Hf, Ca, B, P or combinations thereof;
(b) mixing the silica sand; lime; and optional additives to form a mixture;
(c) melting the mixture in a furnace;
(d) shaping the molten mixture into inorganic fibres, wherein the raw material selection comprises composition selection and proportion selection of the raw materials to obtain an inorganic fibre composition comprising a range of from 61.0 wt % to 70.8 wt % silica; at least 0.20 wt % and less than 2.0 wt % magnesia; less than 2.0% incidental impurities; and no more than 0.1 wt % of metal oxides and/or metal non-oxides derived from said optional additives; with calcia providing the balance up to 100 wt %; and wherein the inorganic fibre composition comprises no more than 0.80 wt % $Al_2O_3$ derived from the incidental impurities and/or the optional additives; and wherein the composition selection and proportion selection of the raw materials is configured so the amount of magnesia in the fibre composition is sufficient to inhibit the formation of surface crystallite grains upon heat treatment at 1100° C. for 24 hours, said surface crystallite grains comprise an average crystallite size in a range of from 0.0 to 0.90 μm.

* * * * *